(12) United States Patent
Yamaguchi et al.

(10) Patent No.: US 11,971,709 B2
(45) Date of Patent: Apr. 30, 2024

(54) LEARNING DEVICE, CONTROL DEVICE, LEARNING METHOD, AND RECORDING MEDIUM

(71) Applicant: OMRON Corporation, Kyoto (JP)

(72) Inventors: Yuki Yamaguchi, Nara (JP); Kennosuke Hayashi, Tokyo (JP); Kin Chung Denny Fu, Kyoto (JP); Yohei Okawa, Koshigaya (JP); Chisato Saito, Tokyo (JP); Yoshiya Shibata, Tokyo (JP)

(73) Assignee: OMRON Corporation, Kyoto (JP)

( * ) Notice: Subject to any disclaimer, the term of this patent is extended or adjusted under 35 U.S.C. 154(b) by 682 days.

(21) Appl. No.: 17/269,534

(22) PCT Filed: Sep. 24, 2019

(86) PCT No.: PCT/JP2019/037273
§ 371 (c)(1),
(2) Date: Feb. 19, 2021

(87) PCT Pub. No.: WO2020/071174
PCT Pub. Date: Apr. 9, 2020

(65) Prior Publication Data
US 2021/0181728 A1 Jun. 17, 2021

(30) Foreign Application Priority Data
Oct. 1, 2018 (JP) .................... 2018-186800

(51) Int. Cl.
*G05B 19/418* (2006.01)
*B25J 9/16* (2006.01)
*G06N 20/20* (2019.01)

(52) U.S. Cl.
CPC ...... *G05B 19/41885* (2013.01); *B25J 9/1697* (2013.01); *G05B 19/4183* (2013.01); *G06N 20/20* (2019.01)

(58) Field of Classification Search
CPC .......... G05B 19/41885; G05B 19/4183; G05B 2219/39271; B25J 9/1697; B25J 9/163;
(Continued)

(56) References Cited

U.S. PATENT DOCUMENTS 7,890,194 B2 * 2/2011 Pannese ................ B25J 9/1671
703/22
9,811,074 B1 * 11/2017 Aichele ................. B25J 9/1656
(Continued)

FOREIGN PATENT DOCUMENTS

CN 106080590 11/2016
CN 106409120 2/2017
(Continued)

OTHER PUBLICATIONS

"Search Report of Europe Counterpart Application", dated Jun. 7, 2022, p. 1-p. 10.
(Continued)

*Primary Examiner* — Zhipeng Wang
(74) *Attorney, Agent, or Firm* — JCIPRNET

(57) ABSTRACT

The disclosure is to constitute, while reducing a cost for collecting training data used in machine learning that makes a control module acquire an ability to control a robot device, the control module operatable in an actual environment by the machine learning. A learning device according to one aspect of the present invention executes machine learning of an extractor by using a first learning data set constituted by a combination of simulation data and first environmental information and a second learning data set constituted by a combination of actual data and second environmental infor- (Continued)

mation. Further, a learning device according to one aspect of the present invention executes machine learning of a controller by using a third learning data set constituted by a combination of third environmental information, state information, and a control command.

13 Claims, 13 Drawing Sheets

(58) Field of Classification Search
CPC ........ G06N 20/20; G06N 3/045; G06N 3/044; G06N 20/00
See application file for complete search history.

(56) References Cited

U.S. PATENT DOCUMENTS

| | | |
|---|---|---|
| 2017/0285584 A1 | 10/2017 | Nakagawa et al. |
| 2018/0120819 A1 | 5/2018 | Ishiwari |
| 2018/0157957 A1 | 6/2018 | Ambeck-Madsen et al. |

FOREIGN PATENT DOCUMENTS

| | | |
|---|---|---|
| CN | 107263464 | 10/2017 |
| CN | 107392125 | 11/2017 |
| CN | 107479368 | 12/2017 |
| CN | 107615310 | 1/2018 |
| JP | 2004322224 | 11/2004 |
| JP | 2010527086 | 8/2010 |
| JP | 2012043225 | 3/2012 |
| JP | 2016107346 | 6/2016 |
| JP | 2017185577 | 10/2017 |
| JP | 2018097810 | 6/2018 |
| JP | 2018107315 | 7/2018 |
| JP | 2018136767 | 8/2018 |
| KR | 20170052870 | 5/2017 |
| WO | 2017163538 | 9/2017 |

OTHER PUBLICATIONS

"Office Action of China Counterpart Application", dated May 31, 2023, with English translation thereof, pp. 1-13.

"International Search Report (Form PCT/ISA/210) of PCT/JP2019/037273," dated Nov. 26, 2019, with English translation thereof, pp. 1-4.

"Written Opinion of the International Searching Authority (Form PCT/ISA/237) of PCT/JP2019/037273," dated Nov. 26, 2019, with English translation thereof, pp. 1-8.

* cited by examiner

LEARNING DEVICE, CONTROL DEVICE, LEARNING METHOD, AND RECORDING MEDIUM

CROSS-REFERENCE TO RELATED APPLICATION

This application is a 371 application of the International PCT application serial no. PCT/JP2019/037273, filed on Sep. 24, 2019, which claims the priority benefits of Japan Patent Application No. 2018-186800, filed on Oct. 1, 2018. The entirety of each of the above-mentioned patent applications is hereby incorporated by reference herein and made a part of this specification.

TECHNICAL FIELD

The invention relates to a learning device, a control device, a learning method, and a learning program.

RELATED ART

In recent years, techniques for controlling operations of industrial robots such as robot hands using sensor data obtained from sensors such as cameras in production lines for manufacturing products have been developed. For example, Patent Literature 1 proposes a machine learning device that learns the amount of correction for a command value supplied to an industrial machine and the amount of deformation of a substrate from a reference shape in an associated manner using a state variable indicating a state of an environment where a printed board assembling operation is performed and a result of determining whether or not disposition of electronic components mounted on the substrate is appropriate.

CITATION LIST

Patent Literature

Patent Literature 1

Japanese Patent Laid-Open No. 2018-107315

SUMMARY OF INVENTION

Technical Problem

The present inventors found the following problem in a case in which a control module for controlling an industrial robot in a production line is constructed using machine learning as in Patent Literature 1. In order to perform machine learning, learning data is collected using an actual machine of an industrial robot. For example, it is assumed that machine learning is performed to acquire an ability to derive a control command from sensor data obtained from a sensor. In this case, learning data sets each constituted by a combination of sensor data obtained from the actual machine, state information indicating a state of the actual machine, and a control command that the actual machine is caused to execute under the situation are collected. The sensor data and the state information of each learning data set are used as training data (input data), and the control command is used as correct answer data (teacher data). Through the machine learning using the learning data sets, it is possible to construct the control module that acquires the ability to determine a control command appropriate for the situation indicated by the given sensor data and state information if the sensor data and the state information are provided. However, cost such as time and effort are expended collecting a sufficient number of learning data sets using an actual machine. In addition, risks such as damage to the actual machine occur in the process of collecting the learning data sets.

Thus, the present inventors studied collection of learning data using simulation in order to solve such a problem. Since utilization of the simulation enables automation of most of an operation of collecting learning data, it is possible to curb the cost of collecting the learning data. In addition, since there is no need to use any actual machine, the aforementioned risks can be resolved.

However, the present inventors found that the following problem occurs in such a method. There is a gap between data obtained by a simulator and data obtained by an actual machine. Therefore, it is difficult to construct the control module operable in an actual environment even if machine learning of the control module is performed using learning data obtained by the simulator. Moreover, it is difficult to perform additional learning using learning data obtained by the actual machine on the control module constructed using the learning data obtained by the simulator due to influences of the gap in data. Therefore, it is also difficult to correct the control module such that the control module is operable in the actual environment.

Note that such a problem may occur not only in a situation in which the control module of the industrial robot is constructed through machine learning but also in any situation in which a control module of a robot device other than an industrial robot is constructed through machine learning. If learning data is collected using the actual machine in a case in which a control module of an autonomous robot configured to be able to operate autonomously or a mobile body configured to be able to execute an automatic driving operation is constructed through machine learning, cost such as time and effort are expended, and risks such as damage to the actual machine occur. On the other hand, it is difficult to construct the control module that is capable of operating in the actual environment in a case in which the simulator is used.

An aspect of the invention was made in view of such circumstances, and an objective thereof is to provide a technique for constructing, while reducing a cost for collecting learning data used in machine learning that makes a control module acquire an ability to control a robot device, the control module operatable in an actual environment by the machine learning.

Solution to Problem

The invention employs the following configurations in order to solve the aforementioned problem.

In other words, a learning device according to an aspect of the invention is a learning device including: a first data acquisition unit configured to acquire a plurality of first learning data sets, each of which is constituted by a combination of simulation data generated by simulating a sensor that monitors an environment where a task of a robot device is executed and first environmental information related to the environment where the task indicated by the simulation data is executed; a second data acquisition unit configured to acquire a plurality of second learning data sets, each of which is constituted by a combination of actual data obtained by the sensor and second environmental information related to an environment where the task indicated by the actual data is executed; a third data acquisition unit configured to acquire a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information; a first learning processing unit configured to perform machine learning of an extractor using the first learning data sets and the second learning data sets; and a second learning processing unit configured to perform machine learning of a controller using the third learning data sets, in which the performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the performing of the machine learning of the controller includes a training step of training the controller such that if the third environmental information and the state information are input, a control command that conforms to the corresponding control command is output.

In the aforementioned configuration, the control module that executes a series of processes for controlling a robot device is split into two components, namely the extractor and the controller. The extractor is trained through the machine learning such that the extractor extracts the environmental information from the sensor data (the simulation data or the actual data). On the other hand, the controller is trained through the machine learning such that the controller derives the control command from the environmental information and the state information. In this manner, the control module is configured to convert the sensor data into a feature amount (environmental information) once and derive the control command from the obtained feature amount (environmental information) rather than deriving the control command directly from the sensor data.

In the machine learning of the extractor among these components, the extractor is constructed such that the extractor extracts common features of both the simulation data and the actual data using both the types of data. In other words, the extractor is constructed such that both the data, namely the simulation data and the actual data are mapped in a common feature space. In this manner, it is possible to absorb the gap between the simulation data and the actual data and then reflect achievement of the machine learning using the simulation data to the machine learning using the actual data. Therefore, if the number of simulation data items used for the machine learning is sufficient, it is possible to construct an extractor capable of accurately extracting features of a target from the sensor data obtained in the actual environment even when the number of actual data items used for the machine learning is small.

In addition, it is possible to obtain features (environmental information) extracted from the sensor data through the simulation similarly to the actual environment. Therefore, it is possible to construct the controller that is operable in the actual environment through machine learning using the obtained learning data even if the simulator is used without using the actual machine. Thus, with the aforementioned configuration, it is possible to employ the simulation data for at least a part of (preferably for a large part of) the learning data by splitting the control module into the two components, namely the extractor and the controller and thereby to reduce cost for collecting the learning data to be used for the machine learning. Moreover, it is possible to constitute a control module that is operable in the actual environment by the extractor and the controller constructed through the machine learning. Thus, with the aforementioned configuration, it is possible to construct, while reducing a cost for collecting learning data used in machine learning that makes a control module acquire an ability to control a robot device, the control module operatable in an actual environment by the machine learning.

Note that the type of the robot device may not be limited, in particular, and may be appropriately selected in accordance with an embodiment as long as the device has at least one drive unit configured to be able to perform automatic driving. The robot device may be an industrial robot (for example, a robot hand or a belt conveyor) disposed in a production line, an autonomous robot, or a mobile body (for example, a flying object such as a drone or a vehicle such as a passenger car) configured to be able to execute an automatic driving operation, for example. The task may be appropriately selected in accordance with the type of the robot device. In a case in which the robot device is a robot hand, the task may be, for example, gripping of a workpiece or releasing of the gripped workpiece.

The type of the sensor may not be limited, in particular, and may be appropriately selected in accordance with an embodiment as long as the device is able to monitor (or sense) the environment where the task of the robot device is executed. The sensor may be, for example, a camera, a light detection and ranging (LIDAR) sensor, a thermo sensor, a pressure sensor, or a load cell. The type of the sensor data (simulation data, actual data) may be appropriately selected in accordance with the type of the sensor. The sensor data may be, for example, image (for example, an RGB image or a depth image) data, measurement data obtained by the LIDAR sensor, thermo data, or pressure data.

The type of each environmental information may not be limited, in particular, and may be appropriately selected in accordance with an embodiment as long as the information is related to the environment where the task is executed. Each environmental information may be, for example, segmentation information, attributes (a position, a dimension, a posture, a temperature, and the like) of the workpiece, a position where the workpiece is to be released, or attributes of an obstacle (a position, a dimension, a posture, a type, and the like). Also, each environmental information may be expressed in the form of a feature amount output by an intermediate layer of a neural network. The type of the state information may not be limited, in particular, and may be appropriately selected in accordance with an embodiment as long as the state information can indicate a state of the robot device related to the execution of the task. In a case in which the robot device is an industrial robot, the state information may include, for example, the position, the orientation, the angle, the acceleration, and the like of a drive unit of the industrial robot.

The type and the format of the control command may not be limited, in particular, and may be appropriately selected in accordance with the type of the robot device as long as the control command is related to an instruction for an operation of the robot device. In a case in which the robot device is an industrial robot, the control command may define an amount of drive, for example, of the industrial robot. In a case in which the robot device is an autonomous robot, the control command may define, for example, an output sound, an amount of drive of each joint, or a screen display. In a case in which the robot device is a vehicle configured to be able to execute an automatic driving operation, the control command may define, for example, an amount of acceleration, an amount of braking, a steering angle of a handle, turning-on of light, or utilization of a car horn.

The extractor and the controller are constituted by learning models capable of performing machine learning. As the learning model constituting each of the extractor and the controller, a neural network, for example, may be used. In the machine learning according to the aforementioned configuration, the simulation data, the actual data, the third environmental information, and the state information are used as input data (training data), and the first environmental information, the second environmental information, and the control command are used as correct answer data (teacher data). The expression "conform to" in the machine learning corresponds to the condition that an error (an evaluation function, an error function, or a loss function) between an output value of the learning model (the extractor or the controller) and correct answer data is equal to or less than a threshold value. The simulation of the sensor is executed on a simulator. The type of the simulator may not be limited, in particular, and may be appropriately selected in accordance with an embodiment as long as the simulator can simulate the environment where the task of the robot device is executed. The simulator is, for example, software capable of disposing objects such as the robot device and the workpiece in a virtual space and causing the robot device to simulate the execution of the task in the virtual space.

In the learning device according to the aforementioned aspect, the simulation data of each of the first learning data sets may be generated with conditions for simulating the sensor randomly changed. With the configuration, it is possible to appropriately construct, while reducing a cost for collecting learning data used in machine learning that makes a control module acquire an ability to control a robot device, the control module operatable in an actual environment by the machine learning. Note that the conditions for the target simulation may not be limited, in particular, and may be appropriately selected in accordance with the type of the sensor to be simulated. In a case in which the sensor to be simulated is a camera, the conditions for the simulation may be, for example, the position of the camera or the type of texture to be attached to each region.

In the learning device according to the aforementioned aspect, the extractor may be constituted by a neural network, the neural network may be split into a first portion, a second portion, and a third portion, the first portion and the second portion may be disposed in parallel on an input side of the neural network, have the same structure, and thus have common parameters, the first portion may be configured to receive an input of the simulation data, the second portion may be configured to receive an input of the actual data, the third portion may be disposed on an output side of the neural network and may be configured to receive an output of each of the first portion and the second portion, in the first training step, the first learning processing unit may adjust each of values of the parameters of the first portion and the third portion such that an output value that conforms to the corresponding first environmental information is output from the third portion if the simulation data is input to the first portion for each of the first learning data sets, and the first learning processing unit may copy the adjusted value of the parameter of the first portion to the parameter of the second portion after the first training step is executed and before the second training step is executed. With the configuration, it is possible to appropriately construct, while reducing a cost for collecting learning data used in machine learning that makes a control module acquire an ability to control a robot device, the control module operatable in an actual environment by the machine learning.

In the learning device according to the aforementioned aspect, in the second training step, the first learning processing unit may adjust the value of the parameter of the second portion such that if the actual data is input to the second portion for each of the second learning data sets with the value of the parameter of the third portion fixed, an output value that conforms to the corresponding second environmental information is output from the third portion. With the configuration, it is possible to appropriately construct, while reducing a cost for collecting learning data used in machine learning that makes a control module acquire an ability to control a robot device, the control module operatable in an actual environment by the machine learning.

In the learning device according to the aforementioned aspect, the third environmental information may be obtained through extraction from other simulation data generated by simulating the sensor using the extractor after completion of the machine learning. With the configuration, it is possible to appropriately construct, while reducing a cost for collecting learning data used in machine learning that makes a control module acquire an ability to control a robot device, the control module operatable in an actual environment by the machine learning.

In the learning device according to the aforementioned aspect, the robot device may be an industrial robot in a production line, the sensor may be constituted by a camera, a pressure sensor, a load cell or a combination thereof, each of the environmental information may include at least any of segmentation information, information related to attributes of a workpiece that is a target of the task, information related to a position where the task is executed, information indicating whether or not there is an obstacle, and information related to attributes of the obstacle, and the control command may define the amount of drive of the industrial robot. With the configuration, it is possible to construct the control module for controlling operations of an industrial robot.

In the learning device according to the aforementioned aspect, the robot device may be an autonomous robot configured to be able to operate autonomously, the sensor may be constituted by a camera, a thermo sensor, a microphone, or a combination thereof, each of the environmental information may include at least any of segmentation information and information related to attributes of a target in relation to the execution of the task, and the control command may define at least any of an amount of drive of the autonomous robot, an output sound, and a screen display. With the configuration, it is possible to construct a control module for controlling operations of an autonomous robot. Note that the target may include not only a thing but also a person.

In the learning device according to the aforementioned aspect, the robot device may be a mobile body configured to be able to execute an automatic driving operation, the sensor may be constituted by a camera, a LIDAR sensor, or a combination thereof, each of the environmental information may include at least any of information related to a path through which the mobile body travels and information related to a target that is present in a traveling direction of the mobile body, and the control command may define at least any of an amount of acceleration of the mobile body, an amount of braking, a steering angle of a handle, turning-on of light, and utilization of a car horn. With the configuration, it is possible to construct a control module for controlling operations of a mobile body.

Also, a control device according to an aspect of the invention is a control device that controls operations of a robot device, the control device including: a data acquisition unit configured to acquire sensor data obtained by a sensor that monitors an environment where a task of the robot device is executed and state information related to a state of the robot device when the task is executed; an information extraction unit configured to extract, from the sensor data, environmental information related to the environment where the task is executed, using the extractor after machine learning, which is constructed by the learning device according to any one of the aforementioned embodiments, a command determination unit configured to determine a control command for causing the robot device to execute the task under conditions indicated by the environmental information and the state information, using the controller after machine learning, which is constructed by the learning device; and an operation control unit configured to control operations of the robot device based on the determined control command. With the configuration, it is possible to provide a control device capable of appropriately controlling operations of the robot device in the actual environment.

In another aspect of each of the learning device and the control device according the aforementioned embodiments, an aspect of the invention may be an information processing method that realizes each of the aforementioned configurations, may be a program, or may be a storage medium that stores such a program therein and that can be read by a computer or the like. Here, the storage medium that can be read by a computer or the like is a medium that accumulates information such as a program using an electrical, magnetic, optical, mechanical, or chemical action. Also, a control system according to an aspect of the invention may be configured of the learning device and the control device according to any of the aforementioned embodiments.

For example, a learning method according to an aspect of the invention is a learning method including the steps of, by a computer: acquiring a plurality of first learning data sets, each of which is constituted by a combination of simulation data generated by simulating a sensor that monitors an environment where a task of a robot device is executed and first environmental information related to the environment where the task indicated by the simulation data is executed; acquiring a plurality of second learning data sets, each of which is constituted by a combination of actual data obtained by the sensor and second environmental information related to an environment where the task indicated by the actual data is executed; acquiring a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information; performing machine learning of an extractor using the first learning data sets and the second learning data sets; and performing machine learning of a controller using the third learning data sets, wherein the step of performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the step of performing of the machine learning of the controller includes a training step of training the controller such that if the third environmental information and the state information are input, a control command that conforms to the corresponding control command is output.

For example, a non-transient computer-readable recording medium records a learning program according to an aspect of the invention, which is a learning program for causing a computer to execute the steps of: acquiring a plurality of first learning data sets, each of which is constituted by a combination of simulation data generated by simulating a sensor that monitors an environment where a task of a robot device is executed and first environmental information related to the environment where the task indicated by the simulation data is executed; acquiring a plurality of second learning data sets, each of which is constituted by a combination of actual data obtained by the sensor and second environmental information related to an environment where the task indicated by the actual data is executed; acquiring a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information; performing machine learning of an extractor using the first learning data sets and the second learning data sets; and performing machine learning of a controller using the third learning data sets, in which the step of performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the step of performing of the machine learning of the controller includes a training step of training the controller such that if the third environmental information and the state information are input, a control command that conforms to the corresponding control command is output.

Advantageous Effects of Invention

According to the invention, it is possible to construct, while reducing a cost for collecting learning data used in machine learning that makes a control module acquire an ability to control a robot device, the control module operatable in an actual environment by the machine learning.

DESCRIPTION OF EMBODIMENTS

Hereinafter, an embodiment according to an aspect of the invention (hereinafter, also referred to as "the present embodiment") will be described based on the drawings. The present embodiment described below is merely an illustration of the invention in all senses. It is a matter of course that various improvements and modifications can be made without departing from the scope of the invention. In other words, specific configurations in accordance with the present embodiment may be appropriately employed to implement the invention. Note that, although data appearing in the present embodiment will be described in natural language, more specifically, the data is designated by pseudo language, commands, parameters, machine language, or the like that can be recognized by a computer.

§ 1. Application Example

Figure 1:
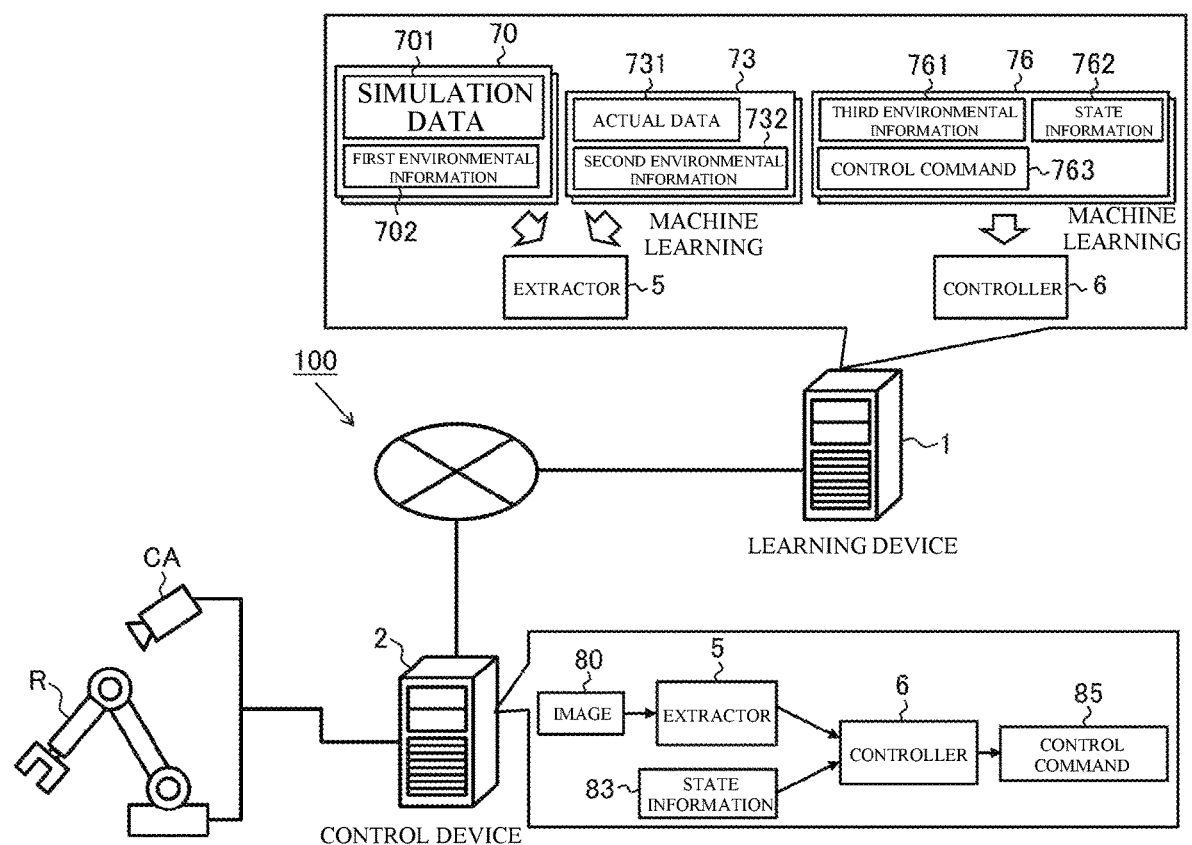
FIG. 1 schematically illustrates an example of a situation to which the invention is applied.

First, an example of a situation in which the invention is applied will be described using FIG. 1. FIG. 1 schematically illustrates an example of an application situation of a control system 100 according to the present embodiment. The example of FIG. 1 assumes a situation in which operations of an industrial robot R (for example, a robot hand) disposed in a production line are controlled. The industrial robot R is an example of the "robot device" according to the invention. However, the application target of the invention may not be limited to such an example, and the invention can be applied in any situation in which operations of a robot device are controlled.

As illustrated in FIG. 1, the control system 100 according to the present embodiment includes a learning device 1 and a control device 2 connected to each other via a network and is configured to be able to perform machine learning of a control module and control of operations of the industrial robot R using the trained control module. The type of the network between the learning device 1 and the control device 2 may be appropriately selected from, for example, the Internet, a wireless communication network, a mobile communication network, a telephone network, and a dedicated network.

The learning device 1 according to the present embodiment is a computer configured to construct a control module for controlling operations of the industrial robot R through machine learning. The control module according to the present embodiment is constituted by an extractor 5 and a controller 6. The extractor 5 is trained such that the extractor 5 extracts environmental information from sensor data obtained by a sensor. The controller 6 is trained such that the controller 6 extracts a control command from the environmental information and state information.

First, the learning device 1 according to the present embodiment acquires a plurality of first learning data sets 70, each of which is constituted by a combination of simulation data 701 and first environmental information 702. The simulation data 701 is generated by simulating a sensor that monitors an environment where a task of the industrial robot R in a production line is executed. The first environmental information 702 is related to an environment where a task indicated by the simulation data 701 is executed.

Also, the learning device 1 according to the present embodiment acquires a plurality of second learning data sets 73, each of which is constituted by a combination of actual data 731 and second environmental information 732. The actual data 731 is obtained from the sensor. The second environmental information 732 is related to an environment where a task indicated by the actual data 731 is executed.

As illustrated in FIG. 1, a camera CA is disposed at a position at which the camera CA can image a movable range of the industrial robot R in the present embodiment, as an example of the sensor for monitoring (sensing) the task execution environment. Therefore, the simulation data 701 according to the present embodiment is image data generated by a simulator and image data simulating a captured image obtained by the camera CA. Meanwhile, the actual data 731 according to the present embodiment is image data (captured image) obtained by the camera CA imaging the environment where the task of the industrial robot R is executed. The camera CA is an example of the "sensor" according to the invention. However, the sensor that can be used in the present embodiment may not be limited to the camera and may be appropriately selected in accordance with the present embodiment.

Further, the learning device 1 according to the present embodiment acquires a plurality of third learning data sets 76, each of which is constituted by a combination of third environmental information 761, state information 762, and a control command 763. The third environmental information 761 is related to the environment where the task of the industrial robot R is executed. The state information 762 is related to a state of the industrial robot R when the task is executed. The control command 763 defines operations for causing the industrial robot R to execute the task under conditions indicated by the third environmental information 761 and the state information 762.

Note that the type of the task may not be limited, in particular, and may be appropriately selected in accordance with the type of the robot device. In a case in which the industrial robot R is a robot hand, the task may be, for example, gripping of a workpiece or releasing of the gripped workpiece. The type of each environmental information (702, 732, 761) may not be limited, in particular, and may be appropriately selected in accordance with the present embodiment as long as the environmental information is related to the environment where the task of the robot device is executed. Each environmental information (702, 732, 761) may include at least any of segmentation information, information related to attributes of a workpiece that is a target of the task, information related to the position where the task is executed, information indicating whether or not there is an obstacle, and information related to attributes of the obstacle, for example. The type of the state information 762 may not be limited, in particular, and may be appropriately selected in accordance with the present embodiment as long as the state information 762 can indicate the state of the robot device in relation to the execution of the task. The state information 762 may include, for example, the position, the orientation, the angle, and the acceleration of a drive unit (for example, an end effector or a joint portion) of the industrial robot R. The type and the format of the control command 763 may not be limited, in particular, and may be appropriately selected in accordance with the type of the robot device as long as the control command 763 is related to an instruction for an operation of the robot device. The control command 763 may define, for example, the amount of drive or the like of the industrial robot R.

Each of the obtained learning data sets (70, 73, 76) is used as learning data for training the control module through machine learning. The learning device 1 according to the present embodiment performs machine learning of the extractor 5 using the first learning data sets 70 and the second learning data sets 73. Specifically, the learning device 1 trains the extractor 5 such that the extractor 5 extracts environmental information that conforms to the corresponding first environmental information 702 from the simulation data 701 for each first learning data set 70 in a first training step. The simulation data 701 corresponds to training data (input data) in the machine learning, and the first environmental information 702 corresponds to the correct answer data (teacher data). In other words, the learning device 1 trains the extractor 5 such that if the simulation data 701 is input, the extractor 5 outputs an output value (environmental information) that conforms to the corresponding first environmental information 702 for each first learning data set 70.

After the first training step is executed, the learning device 1 trains the extractor 5 such that the extractor 5 extracts environmental information that conforms to the corresponding second environmental information 732 from the actual data 731 for each second learning data set 73. The actual data 731 corresponds to training data (input data) in the machine learning, and the second environmental information 732 corresponds to correct answer data (teacher data). In other words, the learning device 1 trains the extractor 5 such that if the actual data 731 is input, the extractor 5 outputs an output value (environmental information) that conforms to the corresponding second environmental information 732 for each second learning data set 73.

Also, the learning device 1 according to the present embodiment performs machine learning of the controller 6 using the third learning data sets 76. Specifically, the learning device 1 trains the controller 6 such that the controller 6 derives the corresponding control command 763 from the third environmental information 761 and the state information 762 for each third learning data set 76. The third environmental information 761 and the state information 762 correspond to training data (input data) in the machine learning, and the control command 763 corresponds to correct answer data (teacher data). In other words, the learning device 1 trains the controller 6 such that if the third environmental information 761 and the state information 762 are input, the controller 6 outputs an output value (control command) that conforms to the corresponding control command 763 for each third learning data set 76.

Note that the extractor 5 and the controller 6 are constituted by learning models that can perform machine learning. In the present embodiment, each of the extractor 5 and the controller 6 is constituted by a neural network, which will be described later. The training of each of the extractor 5 and the controller 6 involves adjusting a parameter of the learning model constituting each of the extractor 5 and the controller 6. The parameter of the learning model is used for an arithmetic operation to obtain an output value in response to given input data. In a case in which the learning model is constituted by a neural network, the parameter is, for example, a weight of connection between neurons or a threshold value of each neuron. The expression "conform to" in the machine learning corresponds to the condition that the parameter of the learning model is adjusted such that an error (an evaluation function, an error function, or a loss function) between the output value of the learning model and the correct answer data is equal to or less than a threshold value.

On the other hand, the control device 2 according to the present embodiment is a computer configured to control operations of the industrial robot R using the control module constituted by the learning device 1. Specifically, the control device 2 according to the present embodiment acquires sensor data obtained by the sensor that monitors the environment where the task of the industrial robot R is executed. In the present embodiment, a camera CA is used as an example of the sensor. Therefore, the control device 2 acquires image data 80 obtained by the camera CA as an example of the sensor data. Also, the control device 2 according to the present embodiment acquires state information 83 related to the state of the industrial robot R when the task is executed.

Next, the control device 2 according to the present embodiment extracts, from the image data 80, environmental information related to the environment where the task is executed, using the extractor 5 after machine learning, which is constructed by the learning device 1. Specifically, the control device 2 acquires an output value corresponding to the environmental information from the extractor 5 by inputting the image data 80 to the extractor 5 after machine learning and executing an arithmetic operation for the extractor 5.

Next, the control device 2 according to the present embodiment determines a control command 85 for causing the industrial robot R to execute the task under conditions indicated by the environmental information and the state information 83, using the controller 6 after machine learning which is constructed by the learning device 1. Specifically, the control device 2 acquires an output value corresponding to the control command 85 from the controller 6 by inputting the environmental information and the state information 83 to the controller 6 after machine learning and executing an arithmetic operation for the controller 6. Then, the control device 2 according to the present embodiment controls operations of the industrial robot R based on the determined control command 85.

As described above, the control module for controlling the operations of the industrial robot R is split into two components, namely the extractor 5 and the controller 6 in the present embodiment. Between these components, in the machine learning of the extractor 5, the extractor 5 is constructed to extract common features (environmental information) from both the simulation data 701 and the actual data 731 using both data (701, 731). In this manner, it is possible to absorb a gap between the simulation data 701 and the actual data 731 in the process of the machine learning of the extractor 5 and then reflect achievement of the first training step using the simulation data 701 to the second training step using the actual data 731. Therefore, even if the number of actual data items 731 (the second learning data sets 73) used for machine learning is small, it is possible to construct the extractor 5 after machine learning capable of accurately extracting environmental information from the sensor data obtained in the actual environment as long as the number of simulation data items 701 (first learning data sets 70) used for machine learning is sufficient.

In addition, the features (environmental information) extracted from the sensor data can be obtained through simulation similarly to the actual environment. Therefore, it is possible to construct the controller 6 after machine learning that is capable of operating in the actual environment through machine learning using the obtained third learning data sets 76 even if a simulator is used without using an actual machine of the industrial robot R. Therefore, according to the present embodiment, it is possible to employ the simulation data 701 for at least some (preferably most) learning data by splitting the control module into two components, namely the extractor 5 and the controller 6, and thereby to reduce the cost of collecting learning data used for machine learning. Further, it is possible to constitute the control module that is capable of operating in the actual environment with the extractor 5 and the controller 6 constituted through the machine learning. Therefore, according to the present embodiment, it is possible to construct, while reducing a cost for collecting learning data used in machine learning that makes a control module acquire an ability to control an industrial robot R, the control module operatable in an actual environment by the machine learning. Also, according to the control device 2 in the present embodiment, it is possible to appropriately control operations of the industrial robot R in the actual environment using the thus constructed control module.

§ 2. Configuration Example

"Hardware Configuration"
<Learning Device>

Figure 2:
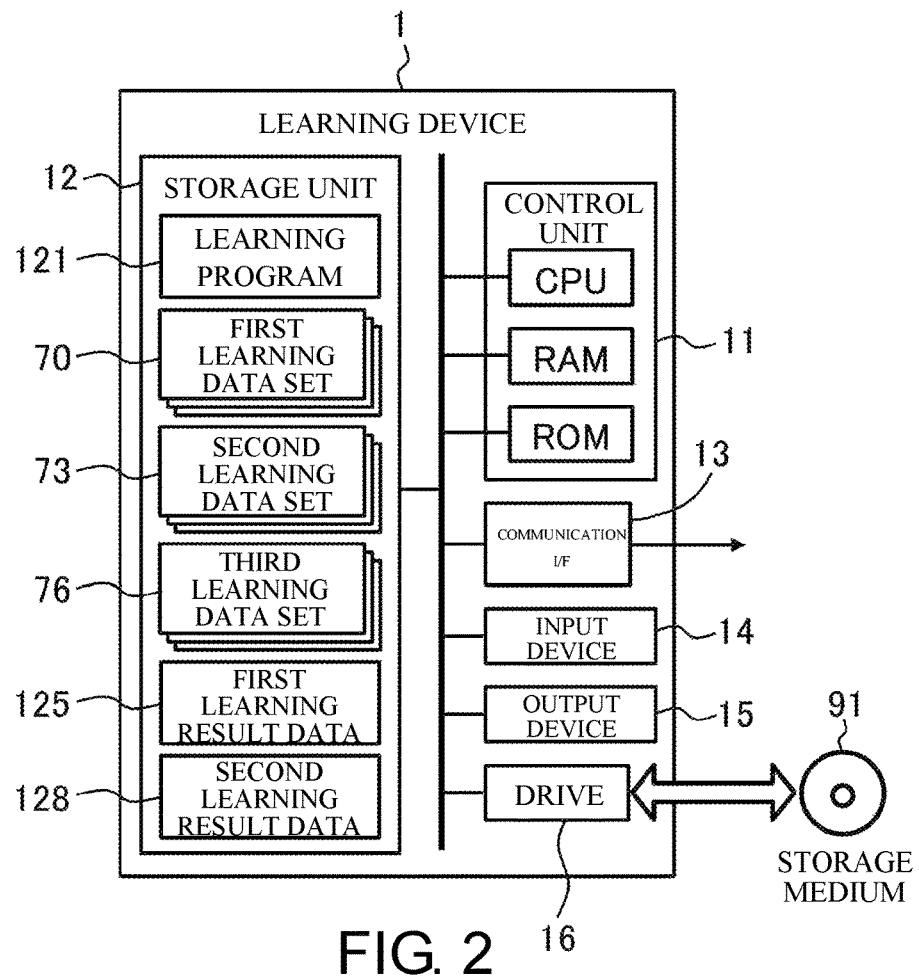
FIG. 2 schematically illustrates an example of a hardware configuration of a learning device according to an embodiment.

Next, an example of a hardware configuration of the learning device 1 according to the present embodiment will be described using FIG. 2. FIG. 2 schematically illustrates an example of the hardware configuration of the learning device 1 according to the present embodiment.

As illustrated in FIG. 2, the learning device 1 according to the present embodiment is a computer in which a control unit 11, a storage unit 12, a communication interface 13, an input device 14, an output device 15, and a drive 16 are electrically connected to each other. Note that in FIG. 2, the communication interface is illustrated as a "communication I/F".

The control unit 11 includes a central processing unit (CPU) that is a hardware processor, a random access memory (RAM), a read only memory (ROM), and the like and is configured to execute information processing based on a program and various kinds of data. The storage unit 12 is an example of a memory and is constituted by, for example, a hard disk drive or a solid state drive. In the present embodiment, the storage unit 12 stores various kinds of information such as a learning program 121, the plurality of first learning data sets 70, the plurality of second learning data sets 73, the plurality of third learning data sets 76, first learning result data 125, and second learning result data 128.

The learning program 121 is a program that causes the learning device 1 to execute information processing (FIGS. 7 and 8) of machine learning, which will be described later, and construct the extractor 5 after learning and controller 6 after learning. The learning program 121 includes a series of orders for the information processing. The plurality of first learning data sets 70 and the plurality of second learning data sets 73 are used for machine learning of the extractor 5. The plurality of third learning data sets 76 are used for machine learning of the controller 6. The first learning result data 125 is data for setting the extractor 5 after learning which is constructed through machine learning. The second learning result data 128 is data for setting the controller 6 after learning which is constructed through machine learning. The first learning result data 125 and the second learning result data 128 are generated as results of executing the learning program 121. Details will be described later.

The communication interface 13 is an interface that is, for example, a wired local area network (LAN) module or a wireless LAN module and that is for establishing wired or wireless communication via a network. The learning device 1 can perform data communication with another information processing device (for example, the control device 2) via a network using the communication interface 13.

The input device 14 is a device for performing inputs, such as a mouse or a keyboard, for example. Also, the output device 15 is a device for performing outputs, such as a display or a speaker, for example. An operator can operate the learning device 1 using the input device 14 and the output device 15.

The drive 16 is, for example, a CD drive or a DVD drive, which is a drive device for reading a program stored in a storage medium 91. The type of the drive 16 may be appropriately selected in accordance with the type of the storage medium 91. At least any of the learning program 121, the plurality of first learning data sets 70, the plurality of second learning data sets 73, and the plurality of third learning data sets 76 may be stored in the storage medium 91.

The storage medium 91 is a medium that accumulates information such as a program recorded therein using an electrical, magnetic, optical, mechanical, or chemical effect such that information such as the program can be read by a computer, another device, a machine, or the like. The learning device 1 may acquire at least any of the learning program 121, the plurality of first learning data sets 70, the plurality of second learning data sets 73, and the plurality of third learning data sets 76 from the storage medium 91.

Here, FIG. 2 illustrates a disc-type storage medium such as a CD or a DVD as an example of the storage medium 91. However, the type of the storage medium 91 is not limited to the disc type and may be a type other than the disc type. Examples of the storage medium of a type other than the disc type include a semiconductor memory such as a flash memory.

Note that it is possible to appropriately omit, replace, and add components in accordance with the present embodiment in relation to the specific hardware configuration of the learning device 1. For example, the control unit 11 may include a plurality of hardware processors. The hardware processors may be constituted by a microprocessor, a field-programmable gate array (FPGA), a digital signal processor (DSP), and the like. The storage unit 12 may be constituted by the RAM and the ROM included in the control unit 11. At least any of the communication interface 13, the input device 14, the output device 15, and the drive 16 may be omitted. The learning device 1 may be constituted by a plurality of computers. In this case, the hardware configuration of each computer may or may not be the same. Also, the learning device 1 may be an information processing device designed for a specific service to be provided, a general-purpose server device, a personal computer (PC), or the like.

<Control Device>

Figure 3:
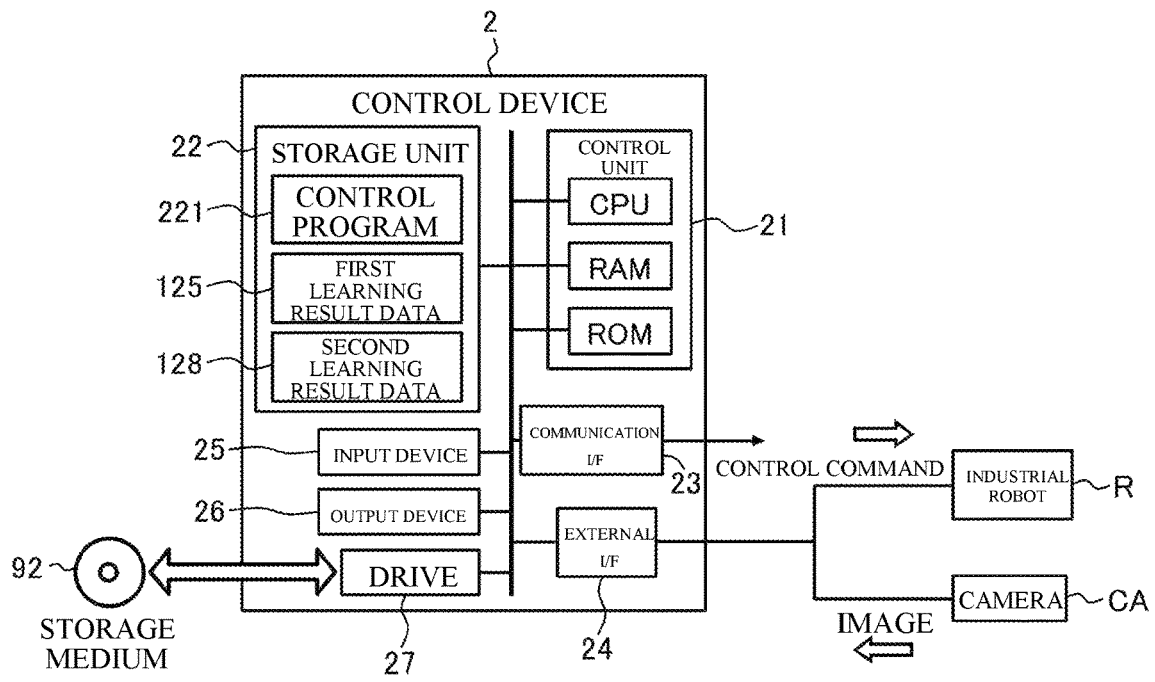
FIG. 3 schematically illustrates an example of a hardware configuration of a control device according to the embodiment.

Next, an example of a hardware configuration of the control device 2 according to the present embodiment will be described using FIG. 3. FIG. 3 schematically illustrates an example of the hardware configuration of the control device 2 according to the present embodiment.

As illustrated in FIG. 3, the control device 2 according to the present embodiment is a computer in which a control unit 21, a storage unit 22, a communication interface 23, an external interface 24, an input device 25, an output device 26, and a drive 27 are electrically connected to each other. Note that in FIG. 3, the communication interface and the external interface are illustrated as a "communication I/F" and an "external I/F", respectively.

Each of the control unit 21 to the communication interface 23 and the input device 25 to the drive 27 in the control device 2 may be configured similarly to the control unit 11 to the drive 16 in the learning device 1, respectively. In other words, the control unit 21 includes a CPU that is a hardware processor, a RAM, a ROM, and the like and is configured to execute various kinds of information processing based on a program and data. The storage unit 22 is constituted, for example, of a hard disk drive or a solid state drive. The storage unit 22 stores various kinds of information such as a control program 221, first learning result data 125, and second learning result data 128.

The control program 221 is a program for causing the control device 2 to execute information processing (FIG. 9), which will be described later, for controlling operations of the industrial robot R using the extractor 5 after learning and the controller 6 after learning. The control program 221 includes a series of orders for the information processing. The first learning result data 125 and the second learning result data 128 are used to set the extractor 5 after learning and the controller 6 after learning in the information processing. Details will be described later.

The communication interface 23 is an interface that is, for example, a wired LAN module or a wireless LAN module and is for establishing wired or wireless communication via a network. The control device 2 can perform data communication with another information processing device (for example, the learning device 1) via the network using the communication interface 23.

The external interface 24 is an interface that is, for example, a universal serial bus (USB) port or a dedicated port and that is for establishing connection to an external device. The type and the number of external interfaces 24 may be appropriately selected in accordance with the type and the number of external devices to be connected thereto.

In the present embodiment, the control device 2 is connected to the industrial robot R and the camera CA via the external interface 24.

The type and the configuration of the industrial robot R may not be limited, in particular, and may be appropriately selected in accordance with the present embodiment. The industrial robot R may include, for example, a robot hand or a belt conveyor. The control device 2 controls operations of the industrial robot R by transmitting a control signal based on a control command to the industrial robot R via the external interface 24. A method of controlling the industrial robot R may not be limited, in particular, and may be appropriately selected in accordance with the present embodiment. The industrial robot R may be controlled directly by the control device 2. Alternatively, the industrial robot R may incorporate a controller (not illustrated) therein. In this case, the controller may be appropriately configured to control operations of the industrial robot R based on a control signal received from the control device 2, processing of the program, and the like.

The camera CA is appropriately disposed such that the camera CA monitors the environment where the task of the industrial robot R is executed. The type of the camera CA may not be limited, in particular, and may be appropriately determined in accordance with the present embodiment. As the camera CA, a known camera such as a digital camera or a video camera, for example, may be used. The control device 2 can acquire image data from the camera CA via the external interface 24. The image data is an example of the "sensor data" according to the invention. Note that in a case in which the industrial robot R and the camera CA include communication interfaces, the control device 2 may be connected to the industrial robot R and the camera CA via the communication interface 23 rather than the external interface 24.

The input device 25 is a device for performing inputs, such as a mouse or a keyboard, for example. Also, the output device 26 is a device for performing outputs, such as a display or a speaker, for example. The operator can operate the control device 2 using the input device 25 and the output device 26.

The drive 27 is, for example, a CD drive or a DVD drive, which is a drive device for reading a program stored in the storage medium 92. At least any of the control program 221, the first learning result data 125, and the second learning result data 128 may be stored in the storage medium 92. Also, the control device 2 may acquire at least any of the control program 221, the first learning result data 125, and the second learning result data 128 from the storage medium 92.

Note that components may be appropriately omitted, replaced, and added in accordance with the present embodiment in relation to the specific hardware configuration of the control device 2 similarly to the aforementioned learning device 1. For example, the control unit 21 may include a plurality of hardware processors. The hardware processors may be constituted by a microprocessor, an FPGA, a DSP, and the like. The storage unit 22 may be constituted by the RAM and the ROM included in the control unit 21. At least any of the communication interface 23, the external interface 24, the input device 25, the output device 26, and the drive 27 may be omitted. The control device 2 may be constituted by a plurality of computers. In this case, a hardware configuration of each computer may or may not be the same. Also, as the control device 2, an information processing device designed for a specific service to be provided, a general-purpose serve device, a general-purpose desktop PC, a laptop PC, a tablet PC, or the like may be used.

[Software Configuration]

Figure 4:
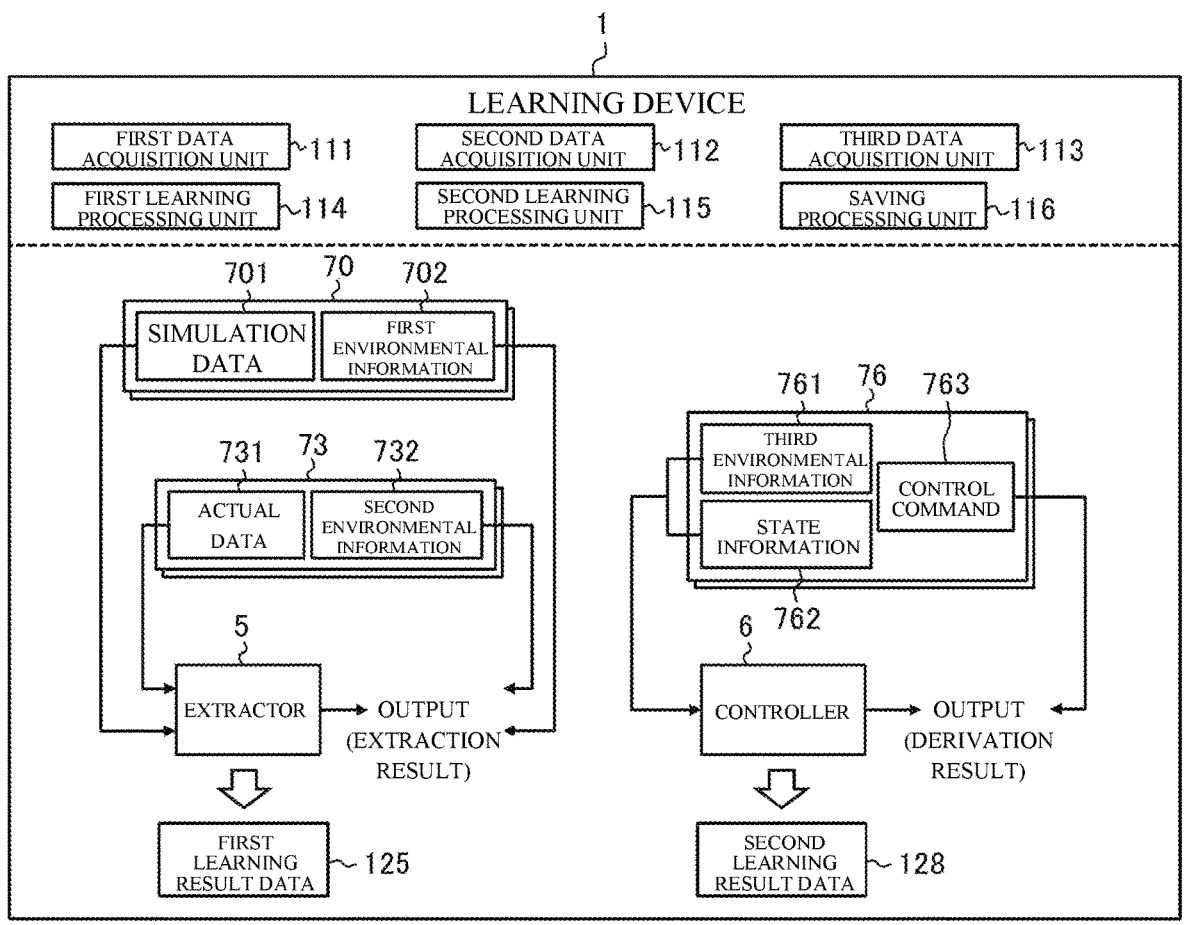
FIG. 4 schematically illustrates an example of a software configuration of the learning device according to the embodiment.

Next, an example of a software configuration of the learning device 1 according to the present embodiment will be described using FIG. 4. FIG. 4 schematically illustrates an example of the software configuration of the learning device 1 according to the present embodiment.

The control unit 11 of the learning device 1 develops, in the RAM, the learning program 121 stored in the storage unit 12. Also, the control unit 11 controls each component by the CPU interpreting and executing the learning program 121 developed in the RAM. In this manner, the learning device 1 according to the present embodiment operates as a computer including, as software modules, a first data acquisition unit 111, a second data acquisition unit 112, a third data acquisition unit 113, a first learning processing unit 114, a second learning processing unit 115, and a saving processing unit 116 as illustrated in FIG. 4. In other words, each software module of the learning device 1 is realized by the control unit 11 (CPU) in the present embodiment.

The first data acquisition unit 111 acquires a plurality of first learning data sets 70, each of which is constituted by a combination of simulation data 701 generated by simulating a sensor that monitors an environment where a task of the industrial robot R is executed and first environmental information 702 related to the environment where the task indicated by the simulation data 701 is executed. The second data acquisition unit 112 acquires a plurality of second learning data sets 73, each of which is constituted by a combination of actual data 731 obtained from the sensor and second environmental information 732 related to the environment where the task indicated by the actual data 731 is executed. The third data acquisition unit 113 acquires a plurality of third learning data sets 76, each of which is constituted by a combination of third environmental information 761 related to the environment where the task is executed, state information 762 related to the state of the industrial robot R when the task is executed, and a control command 763 for causing the industrial robot R to execute the task under conditions indicated by third environmental information 761 and the state information 762.

The first learning processing unit 114 holds the extractor 5 before machine learning is performed. The first learning processing unit 114 performs the machine learning of the extractor 5 using the first learning data sets 70 and the second learning data sets 73. Specifically, the first learning processing unit 114 trains the extractor 5 such that the extractor 5 extracts environmental information that conforms to the corresponding first environmental information 702 from the simulation data 701 for each first learning data set 70 in a first training step. After the first training step is executed, the first learning processing unit 114 trains the extractor 5 such that the extractor 5 extracts environmental information that conforms to the corresponding second environmental information 732 from the actual data 731 for each second learning data set 73 in a second training step. The saving processing unit 116 saves information related to the constructed extractor 5 after learning as the first learning result data 125 in the storage unit 12.

The second learning processing unit 115 holds the controller 6 before machine learning is performed. The second learning processing unit 115 performs machine learning of the controller 6 using the third learning data sets 76. Specifically, the second learning processing unit 115 trains the controller 6 such that if the third environmental information 761 and the state information 762 are input, the controller 6 outputs a control command that conforms to the corresponding control command 763 for each third learning data set 76. The saving processing unit 116 saves information related to the constructed controller 6 after learning as the second learning result data 128 in the storage unit 12.

(Extractor)

Figure 5A:
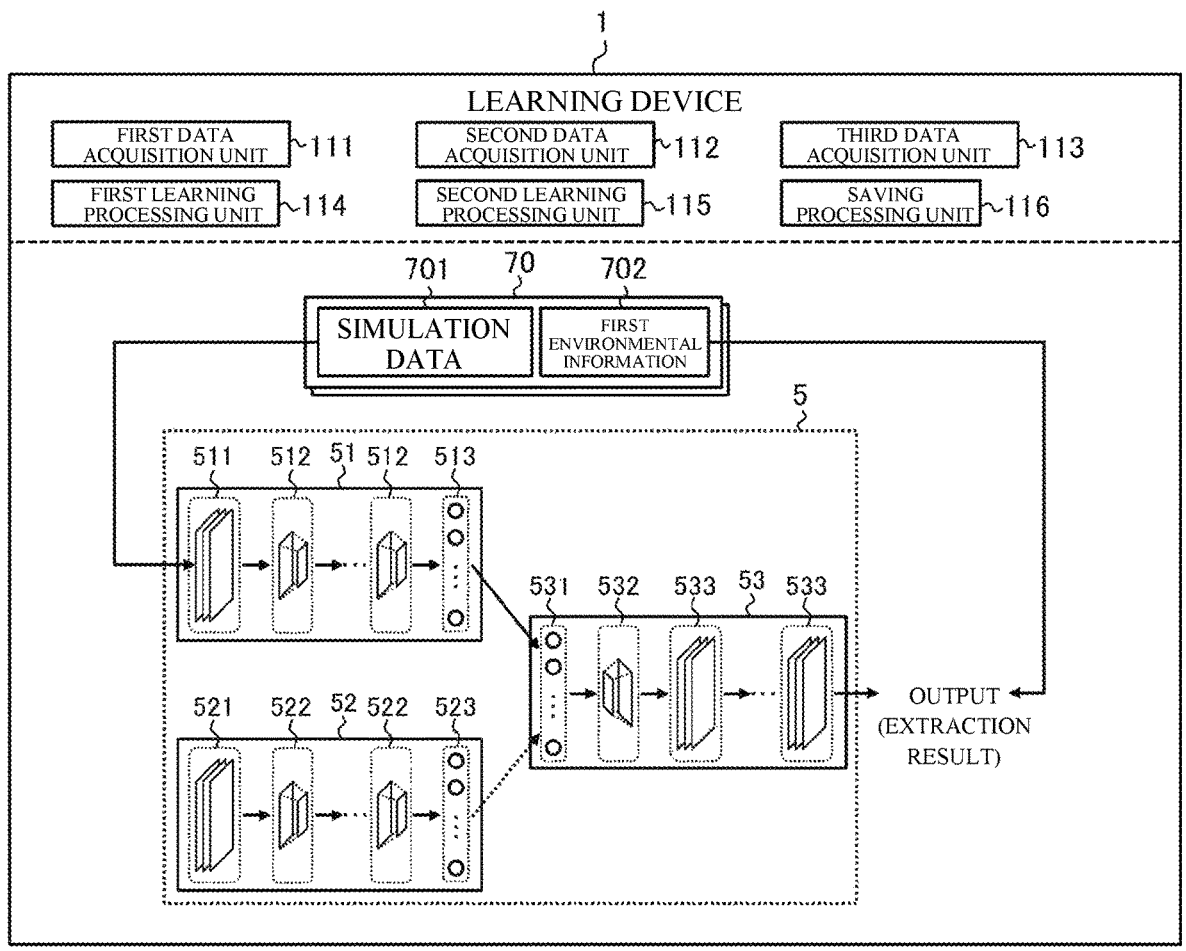
FIG. 5A schematically illustrates an example of a process of machine learning of an extractor performed by the learning device according to the embodiment.
Figure 5B:
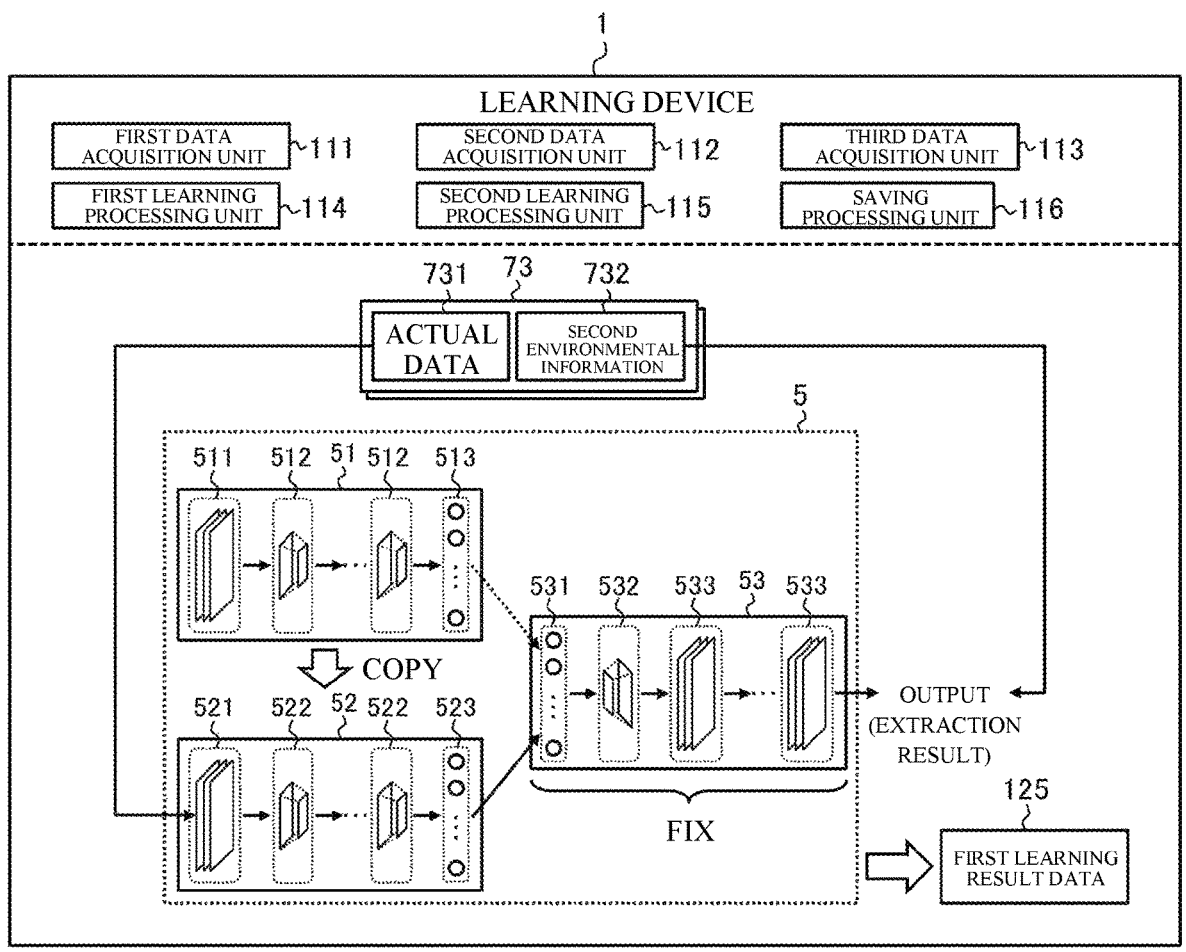
FIG. 5B schematically illustrates an example of the process of the machine learning of the extractor performed by the learning device according to the embodiment.

Next, an example of a configuration of the extractor 5 will be described using FIGS. 5A and 5B. FIG. 5A schematically illustrates an example of a process for the first training step of the extractor 5 according to the present embodiment. FIG. 5B schematically illustrates an example of a process for the second training step of the extractor 5 according to the present embodiment. As illustrated in FIGS. 5A and 5B, the extractor 5 according to the present embodiment is constituted by a neural network. The neural network is split into a first portion 51, a second portion 52, and a third portion 53. The first portion 51 and the second portion 52 are disposed in parallel on the input side of the neural network. Meanwhile, the third portion 53 is disposed on the output side of the neural network.

The first portion 51 according to the present embodiment is constituted by a so-called convolutional neural network. Specifically, the first portion 51 includes convolution layers 511, pooling layers 512, and a fully connected layer 513. In the first portion 51 according to the present embodiment, the convolution layers 511 and the pooling layers 512 are alternately disposed on the input side. Also, an output of the pooling layer 512 disposed furthest on the output side is input to the fully connected layer 513. An output of the fully connected layer 513 corresponds to an output of the first portion 51. The numbers of the convolution layers 511 and the pooling layers 512 may be appropriately selected in accordance with the present embodiment.

The convolution layers 511 are layers for performing a convolution arithmetic operation of an image. The convolution of an image corresponds to processing of calculating a correlation between the image and a predetermined filter. Therefore, it is possible to detect a concentration pattern similar to a concentration pattern of the filter from an input image, for example, through the convolution arithmetic operation of the image. The pooling layers 512 are layers that perform pooling processing. The pooling processing means discarding a part of information at a position with high responsiveness to the image filter and realizes unchangeable response to a minute change in positions of features appearing in the image. The pooling layers 512 may be, for example, maximum pooling layers configured to select a pixel of a maximum value from among a plurality of pixels that are targets of processing. The fully connected layer 513 is a layer connecting all neurons between adjacent layers. In other words, each of the neurons included in the fully connected layer 513 is connected to all neurons included in adjacent layers. Two or more fully connected layers 513 may be provided.

The number of neurons (nodes) included in each of the layers 511 to 513 may be appropriately selected in accordance with the present embodiment. The neurons in adjacent layers are appropriately connected, and a weight (connection load) is set for each connection. A threshold value is set for each neuron, and an output of each neuron is determined basically depending on whether or not a sum of products of inputs and weights exceeds the threshold value. The weight of connection between the neurons included in the layers 511 to 513 and the threshold value of each neuron are examples of parameters of the first portion 51 used for the arithmetic operation.

The second portion 52 according to the present embodiment is also constituted by a so-called convolutional neural network similarly to the first portion 51. In other words, the second portion 52 includes convolution layers 521, pooling layers 522, and a fully connected layer 523. In the present embodiment, each of the layers 521 to 523 of the second portion 52 is configured similarly to each of the layers 511 to 513 of the first portion 51. In other words, the number of neurons included in each of the layers 521 to 523 and the connection of neurons in adjacent layers are set to be the same as those in the first portion 51. In this manner, the first portion 51 and the second portion 52 are configured to have mutually the same structures and common parameters. The weight of the connection between neurons included in the layers 521 to 523 and the threshold value of each neuron are examples of the parameters of the second portion 52 used for the arithmetic operation.

On the other hand, the third portion 53 according to the present embodiment has such a structure that the input side and the output side of the first portion 51 are inverted. Specifically, the third portion 53 includes a fully connected layer 531, upsampling layers 532, and convolution layers 533. The upsampling layers 532 are layers that perform inverse pooling processing. In the third portion 53 according to the present embodiment, the fully connected layer 531 is disposed furthest on the input side, and an output of the fully connected layer 531 is input to the upsampling layer 532 disposed furthest on the input side. Then, the upsampling layers 532 and the convolution layers 533 are alternately disposed on the output side. An output of the convolution layer 533 disposed furthest on the output side corresponds to an output of the third portion 53. The numbers of the upsampling layers 532 and the convolution layers 533 may be appropriately selected in accordance with the present embodiment. Also, two or more fully connected layers 531 may be provided. The weight of the connection between neurons included in the layers 531 to 533 and the threshold value of each neuron are examples of parameters of the third portion 53 used for the arithmetic operation.

The convolution layer 511 disposed furthest on the input side in the first portion 51 is configured to receive an input of the simulation data 701. The convolution layer 521 disposed furthest on the input side in the second portion 52 is configured to receive an input of the actual data 731. The fully connected layer 531 of the third portion 53 is configured to receive an output of each of the first portion 51 and the second portion 52. However, the configuration of each of the portions 51 to 53 may not be limited to such an example and may be appropriately set in accordance with the present embodiment.

As illustrated in FIG. 5A, the first learning processing unit 114 blocks (ignore) the connection between the second portion 52 and the third portion 53 in the first training step. Then, the first learning processing unit 114 adjusts the value of the parameter of each of the first portion 51 and the third portion 53 such that if the simulation data 701 is input to the first portion 51, an output value that conforms to the corresponding first environmental information 702 is output from the third portion 53 for each first learning data set 70 through the following procedure.

First, the first learning processing unit 114 inputs the simulation data 701 to the convolution layer 511 disposed furthest on the input side in the first portion 51 for each first learning data set 70 and executes the arithmetic operation of the extractor 5 using the parameters of the first portion 51 and the third portion 53. As a result of the arithmetic operation, the first learning processing unit 114 acquires, from the convolution layer 533 disposed furthest on the output side in the third portion 53, an output value corresponding to the result of extracting the environmental information from the simulation data 701. Next, the first learning processing unit 114 calculates an error between the acquired output value and the first environmental information 702. Then, the first learning processing unit 114 adjusts the value of the parameter of each of the first portion 51 and the third portion 53 such that the sum of the calculated errors decreases.

The first learning processing unit 114 repeatedly adjusts the value of the parameter of each of the first portion 51 and the third portion 53 until the sum of errors between the output values obtained from the third portion 53 and the first environmental information 702 is equal to or less than a threshold value. The first learning processing unit 114 can thus construct the extractor 5 trained such that if the simulation data 701 is input to the first portion 51, the extractor 5 outputs an output value that conforms to the corresponding first environmental information 702 from the third portion 53 for each first learning data set 70.

Next, after the first training step is executed and before the second training step is executed, the first learning processing unit 114 copies the adjusted value of each parameter of the first portion 51 to the corresponding parameter of the second portion 52 as illustrated in FIG. 5B. In the second training step, the first learning processing unit 114 releases the blocking of the connection of between the second portion 52 and the third portion 53 and blocks (ignores) the connection between the first portion 51 and the third portion 53. Then, in the present embodiment, the first learning processing unit 114 adjusts the value of the parameter of the second portion 52 such that if the actual data 731 is input to the second portion 52 for each of the second learning data sets 73 with the value of the parameter of the third portion 53 fixed, an output value that conforms to the corresponding second environmental information 732 is output from the third portion 53 in the following procedure.

First, the first learning processing unit 114 inputs the actual data 731 to the convolution layer 521 disposed furthest on the input side in the second portion 52 for each second learning data set 73 and executes the arithmetic operation for the extractor 5 using the parameters of the second portion 52 and the third portion 53. As a result of the arithmetic operation, the first learning processing unit 114 acquires, from the convolution layer 533 disposed furthest on the output side in the third portion 53, an output value corresponding to the result of extracting the environmental information from the actual data 731. Next, the first learning processing unit 114 calculates an error between the acquired output value and the second environmental information 732. Then, the first learning processing unit 114 adjusts the value of the parameter of the second portion 52 such that the sum of calculated errors decreases.

The first learning processing unit 114 repeatedly adjusts the value of the parameter of the second portion 52 until the sum of errors between output values obtained from the third portion 53 and the second environmental information 732 is equal to or less than a threshold value. The first learning processing unit 114 can thus construct the extractor 5 trained such that if the actual data 731 is input to the second portion 52 for each second learning data set 73, an output value that conforms to the corresponding second environmental information 732 is output from the third portion 53.

After these training steps are completed, the saving processing unit 116 generates the first learning result data 125 indicating the configuration (for example, the number of layers in the neural network, the number of neurons in each layer, a connection relationship between neurons, and a transfer function of each neuron) and an arithmetic parameters (for example, the weight of connection between neurons and the threshold value of each neuron) of the constructed extractor 5 after learning. Then, the saving processing unit 116 saves the generated first learning result data 125 in the storage unit 12.

(Controller)

Figure 5C:
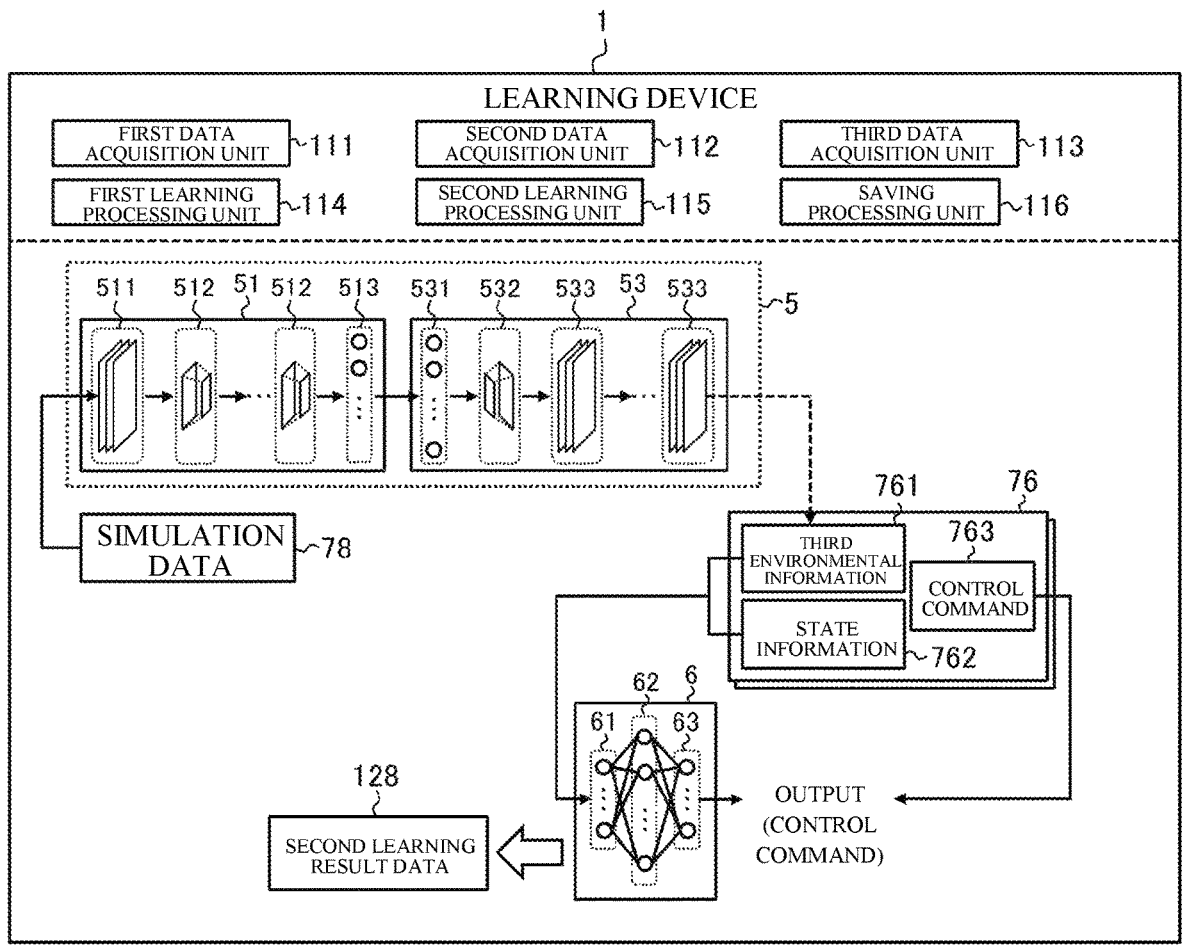
FIG. 5C schematically illustrates an example of a process of a machine learning of a controller performed by the learning device according to the embodiment.

Next, an example of a configuration of the controller 6 will be described using FIG. 5C. FIG. 5C schematically illustrates an example of a process for machine learning of the controller 6 according to the present embodiment. As illustrated in FIG. 5C, the controller 6 according to the present embodiment is constituted by a neural network with a multilayer structure used in so-called deep learning and includes an input layer 61, an intermediate layer (hidden layer) 62, and an output layer 63. However, the configuration of the controller 6 may not be limited to such an example and may be appropriately set in accordance with the present embodiment. For example, the controller 6 may include two or more intermediate layers 62.

The number of neurons included in each of the layers 61 to 63 may be appropriately set in accordance with the present embodiment. The neurons in adjacent layers are appropriately connected, and a weight (connection load) is set for each connection. In the example of FIG. 5C, each neuron is connected to all neurons in the adjacent layers. However, the connection of neurons may not be limited to such an example and may be appropriately set in accordance with the present embodiment. A threshold value is set for each neuron, and an output of each neuron is determined basically depending on whether or not a sum of products of inputs and weights exceeds the threshold value. The weight of the connection between neurons and the threshold value of each neuron included in each of the layers 61 to 63 are examples of the parameters of the controller 6 used for the arithmetic operation.

In the machine learning of the controller 6, the second learning processing unit 115 inputs the third environmental information 761 and the state information 762 to the input layer 61 of the controller 6 for each third learning data set 76 and executes an arithmetic operation for the controller 6 using the parameters of each of the layers 61 to 63 first. As a result of the arithmetic operation, the second learning processing unit 115 acquires, from the output layer 63, an output value corresponding to the result of deriving a control command from the third environmental information 761 and the state information 762. Next, the second learning processing unit 115 calculates an error between the acquired output value and the control command 763. Then, the second learning processing unit 115 adjusts the value of the parameter of the controller 6 such that the sum of calculated errors decreases.

The second learning processing unit 115 repeatedly adjusts the value of the parameter of the controller 6 until the sum of errors between the output values obtained from the output layer 63 and the control command 763 is equal to or less than a threshold value. The second learning processing unit 115 can thus construct the controller 6 trained such that if the third environmental information 761 and the state information 762 are input to the input layer 61 for each third learning data set 76, an output value that conforms to the corresponding control command 763 is output from the output layer 63.

After the processing of the machine learning is completed, the saving processing unit 116 generates the second learning result data 128 indicating the configuration (for example, the number of layers in the neural network, the number of neurons in each layer, the connection relationship between the neurons, and the transfer function of each neuron) and the arithmetic operation parameters (for example, the weight of connection between neurons and the threshold value of each neuron) of the constructed controller 6 after learning. Then, the saving processing unit 116 saves the generated second learning result data 128 in the storage unit 12.

Note that the third environmental information 761 of each third learning data set 76 may be obtained by being extracted from other simulation data 78 generated through simulation of the sensor, using the extractor 5 after completion of the machine learning. Specifically, the third data acquisition unit 113 acquires the simulation data 78 generated similarly to the simulation data 701. In a case in which the extractor 5 after machine learning is not developed in the RAM, the third data acquisition unit 113 performs setting of the extractor 5 after machine learning with reference to the first learning result data 125. Next, the third data acquisition unit 113 inputs the simulation data 78 to the first portion 51 and executes the arithmetic operation for the extractor 5 using the parameters of the first portion 51 and the third portion 53. As a result of the arithmetic operation, an output value corresponding to the result of extracting the environmental information from the simulation data 78 is output from the third portion 53. The third data acquisition unit 113 may acquire the output value output from the third portion 53 as the third environmental information 761.

<Control Device>

Figure 6:
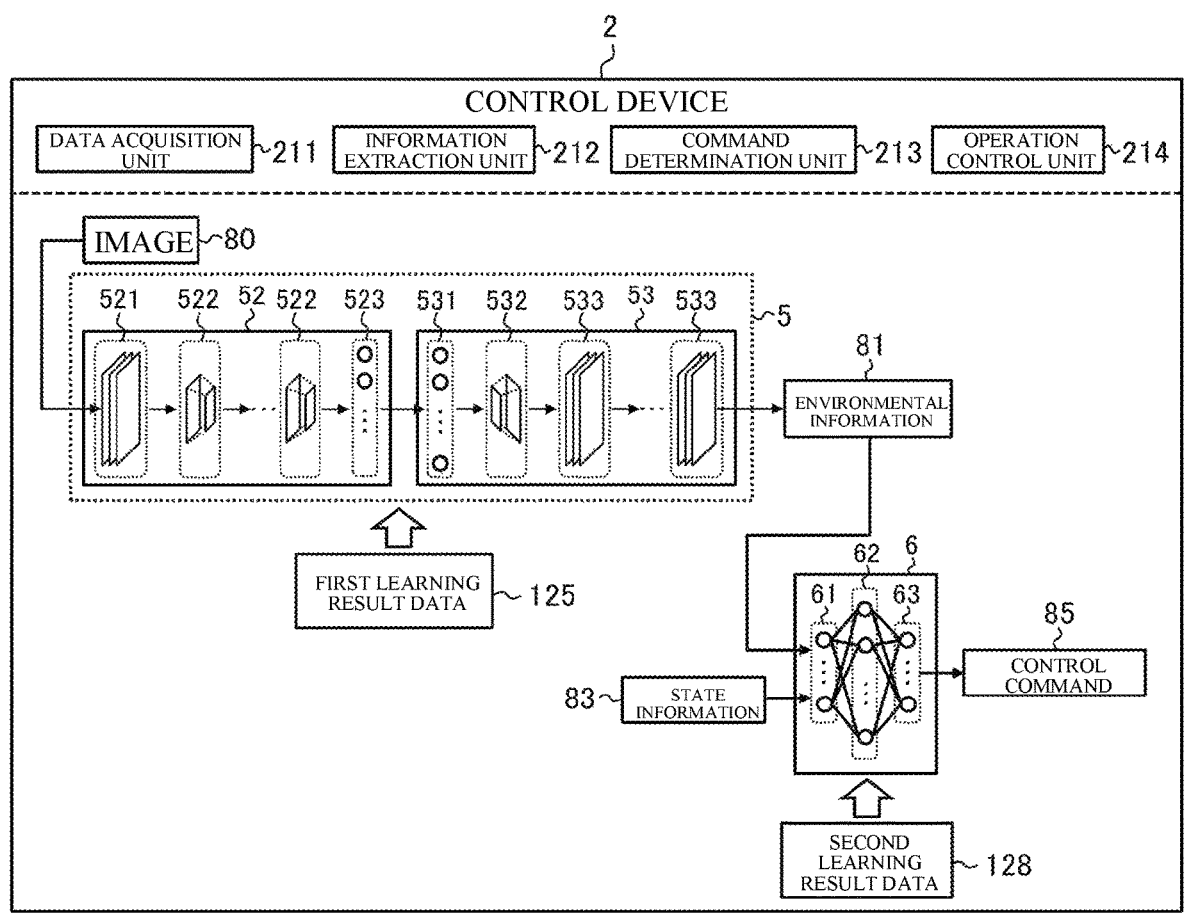
FIG. 6 schematically illustrates an example of a software configuration of the control device according to the embodiment.

Next, an example of a software configuration of the control device 2 according to the present embodiment will be described using FIG. 6. FIG. 6 schematically illustrates an example of the software configuration of the control device 2 according to the present embodiment.

The control unit 21 of the control device 2 develops, in the RAM, the control program 221 stored in the storage unit 22. Then, the control unit 21 controls each component by the CPU interpreting and executing the control program 221 developed in the RAM. In this manner, the control device 2 according to the present embodiment operates as a computer including, as software modules, a data acquisition unit 211, an information extraction unit 212, a command determination unit 213, and an operation control unit 214 as illustrated in FIG. 6. In other words, each software module of the control device 2 is also realized by the control unit 21 (CPU) similarly to the learning device 1 in the present embodiment.

The data acquisition unit 211 acquires the sensor data obtained by the sensor that monitors the environment where the task of the industrial robot R is executed. In the present embodiment, the data acquisition unit 211 acquires the image data 80 obtained by the camera CA as the sensor data. Also, the data acquisition unit 211 acquires state information 83 related to the state of the industrial robot R when the task is executed.

The information extraction unit 212 includes the extractor 5 after machine learning which is constructed by the learning device 1 by holding the first learning result data 125. The information extraction unit 212 performs setting of the extractor 5 after machine learning with reference to the first learning result data 125. Then, the information extraction unit 212 extracts, from the image data 80, the environmental information 81 related to the environment where the task is executed using the extractor 5 after machine learning. In the present embodiment, the information extraction unit 212 inputs the image data 80 to the second portion 52 and executes the arithmetic operation for the extractor 5 using the parameters of the second portion 52 and the third portion 53. As a result of the arithmetic operation, the information extraction unit 212 acquires an output value corresponding to the environmental information 81 from the third portion 53.

The command determination unit 213 includes the controller 6 after machine learning which is constructed by the learning device 1 by holding the second learning result data 128. The command determination unit 213 performs setting of the controller 6 after machine learning with reference to the second learning result data 128. Then, the command determination unit 213 determines the control command 85 for causing the industrial robot R to execute the task under the conditions indicated by the environmental information 81 and the state information 83, using the controller 6 after machine learning. In the present embodiment, the command determination unit 213 inputs the environmental information 81 and the state information 83 to the input layer 61 and executes the arithmetic operation for the controller 6 using the parameters of each of the layers 61 to 63. As a result of the arithmetic operation, the command determination unit 213 acquires an output value corresponding to the determined control command 85 from the output layer 63. The operation control unit 214 controls operations of the industrial robot R based on the determined control command 85.

<Others>

Each of the software modules of the learning device 1 and the control device 2 will be described in detail in operation examples, which will be described later. Note that in the present embodiment, an example in which all the software modules of the learning device 1 and the control device 2 are realized by general-purpose CPUs will be described. However, some or all of the aforementioned software modules may be realized by one or a plurality of dedicated processors. Also, in relation to each of the software configurations of the learning device 1 and the control device 2, software modules may be appropriately omitted, replaced, and added in accordance with the present embodiment.

§ 3. Operation Examples

[Learning Device]

Next, operation examples of the learning device 1 will be described. The learning device 1 according to the present embodiment is configured to be able to select any of two modes, namely a first mode in which machine learning of the extractor 5 is performed and a second mode in which machine learning of the controller 6 is performed and operate in the selected mode. A processing procedure in each mode described below is an example of the "learning method" according to the invention. However, the modes are not necessarily split into the two modes. Each mode may be appropriately omitted or changed. Also, the processing procedures described below are just examples, and each type of the processing may be changed as long as the change can be made. Further, steps can be appropriately omitted, replaced, and added in regard to the processing procedures described below, in accordance with the present embodiment.

<Machine Learning of Extractor>

Figure 7:
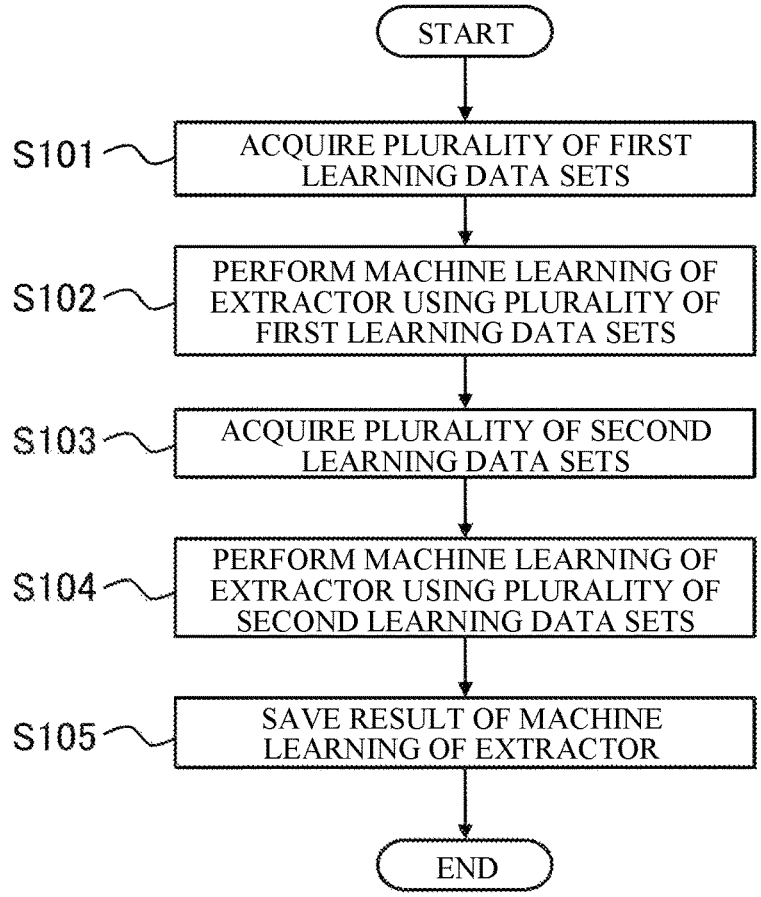
FIG. 7 illustrates an example of a processing procedure for the machine learning of the extractor performed by the learning device according to the embodiment.

First, an example of the processing procedure for the machine learning of the extractor 5 (first mode) performed by the learning device 1 according to the present embodiment will be described using FIG. 7. FIG. 7 is a flowchart illustrating an example of the processing procedure for the machine learning of the extractor 5 performed by the learning device 1 according to the present embodiment.

(Step S101)

In Step S101, the control unit 11 operates as the first data acquisition unit 111 and acquires the plurality of first learning data sets 70, each of which is constituted by a combination of the simulation data 701 and the first environmental information 702.

A method of acquiring each first learning data set 70 may not be limited, in particular, and may be appropriately selected in accordance with the present embodiment. For example, it is possible to generate the simulation data 701 by preparing a simulator and simulating the sensor under various conditions. The type of the simulation may not be limited, in particular, and may be appropriately selected in accordance with the present embodiment as long as it is possible to simulate the environment where a task of the robot device is executed. The type of the task may not be limited, in particular, and may be appropriately selected in accordance with the type of the robot type. The simulator is software capable of disposing an object such as a sensor, a robot device, or a workpiece, for example, in a virtual space and simulating the execution of the task of the robot device in the virtual space. The task is, for example, gripping of a workpiece or a releasing of the gripped workpiece. In the present embodiment, the camera CA is used as the sensor that monitors the environment where the task of the industrial robot R is executed. Therefore, image data obtained by the simulator simulating a captured image obtained by the camera CA is generated as simulation data 701. At this time, the simulation data 701 may be generated with the conditions for simulating the sensor randomly changed. In the present embodiment, the conditions for the simulation are, for example, the position of the camera CA, the field of view of the camera CA, the focal distance of the camera CA, illumination conditions, the type of texture to be attached to each region, attributes of the industrial robot R, and attributes of the workpiece to be disposed.

In addition, it is possible to appropriately generate the first environmental information 702 in accordance with the conditions for the simulation. The type of the first environmental information 702 may not be limited, in particular, and may be appropriately selected in accordance with the present embodiment as long as the first environmental information 702 is related to the environment where the task of the robot device is executed. The first environmental information 702 may include, for example, at least any of segmentation information, information related to attributes of the workpiece that is a target of the task, information related to the position where the task is executed, information indicating whether or not there is an obstacle, and information related to attributes of the obstacle. The segmentation information indicates a result of sectioning a region of each target through identification of each object that appears in an image. The segmentation information may include information indicating attributes of each target estimated based on the result of identifying each target. The information related to attributes of the workpiece indicates, for example, the position, the shape, the dimension, the posture, the weight, and the temperature of the workpiece. The information related to the position where the task is executed indicates, for example, the position where the workpiece is to be released. The information related to attributes of the obstacles indicates, for example, the positions, the shapes, the dimensions, the postures, the weights, and the temperatures of the obstacles. It is possible to generate each first learning data set 70 by combining (associating) the generated first environmental information 702 with the corresponding simulation data 701.

Each first learning data set 70 may be automatically generated through operations of a computer or may be manually generated through operations of the operator. Also, the generation of each first learning data set 70 may be performed by the learning device 1 or may be performed by a computer other than the learning device 1. In a case in which each first learning data set 70 is generated by the learning device 1, the control unit 11 acquires the plurality of first learning data sets 70 by executing the aforementioned series of processes automatically or manually through operations of the operator. On the other hand, in a case in which each first learning data set 70 is generated by another computer, the control unit 11 acquires the plurality of first learning data sets 70 generated by another computer via a network or the storage medium 91, for example.

The number of first learning data sets 70 to be acquired may not be limited, in particular, and may be appropriately selected in accordance with the present embodiment. If the plurality of first learning data sets 70 are acquired, then the control unit 11 proceeds the processing to next Step S102.

(Step S102)

In Step S102, the control unit 11 operates as the first learning processing unit 114 and performs machine learning of the extractor 5 using the plurality of first learning data sets 70. In the machine learning, the control unit 11 trains the extractor 5 such that the extractor 5 extracts environmental information that conforms to the corresponding first environmental information 702 from the simulation data 701 for each first learning data set. Step S102 is an example of the "first training step" according to the invention.

Specifically, the control unit 11 prepares the extractor 5 that is a target of processing first. A configuration of the extractor 5 to be prepared, an initial value of the weight of connection between neurons, and an initial value of the threshold value of each neuron may be provided by a template or may be provided through inputs of the operator. Also, in a case in which re-learning is performed, the control unit 11 may prepare the extractor 5 based on learning result data obtained through machine learning in the past.

Next, the control unit 11 executes learning processing of the first portion 51 and the third portion 53 of the extractor 5 using, as input data, the simulation data 701 included in each first learning data set 70 acquired in Step S101 and using, as teacher data, the corresponding first environmental information 702. For the learning processing, a stochastic gradient descent method or the like may be used. In the present embodiment, connection between the second portion 52 and the third portion 53 is ignored in the learning processing.

For example, in the first step, the control unit 11 inputs the simulation data 701 to the convolution layer 511 disposed furthest on the input side in the first portion 51 for each first learning data set 70 and performs ignition determination of each neuron included in each layer (511 to 513, 531 to 533) in order from the input side. In this manner, the control unit 11 acquires, from the convolution layer 533 disposed furthest on the output side in the third portion 53, an output value corresponding to the result of extracting the environmental information from the simulation data 701. In the second step, the control unit 11 calculates an error between the acquired output value and the corresponding first environmental information 702. In the third step, the control unit 11 calculates each of errors of the weights of the connection between neurons and the threshold values of the neurons, using the error of the calculated output value by an error back propagation method. In the fourth step, the control unit 11 updates each of the values of the weights of the connection between neurons and the threshold values of the neurons, based on each calculated error.

The control unit 11 adjusts the value of the parameter of each of the first portion 51 and the third portion 53 such that if the simulation data 701 is input to the first portion 51, the output value that conforms to the corresponding first environmental information 702 is output from the third portion 53 for each first learning data set 70, through repetition of the aforementioned first to fourth steps. In other words, the control unit 11 repeatedly adjusts the values of the parameters of the first portion 51 and the third portion 53 in the aforementioned first to fourth steps until the sum of errors between the output values obtained from the convolution layer 533 furthest on the output side in the third portion 53 and the first environmental information 702 is equal to or less than the threshold value for each first learning data set 70. The threshold value may be appropriately set in accordance with the present embodiment. In this manner, the control unit 11 can construct the extractor 5 trained such that if the simulation data 701 is input to the first portion 51, the output value that conforms to the corresponding first environmental information 702 is output from the third portion 53 for each first learning data set 70. If the machine learning using the first learning data set 70 is completed, then the control unit 11 proceeds the processing to next Step S103.

(Step S103)

In Step S103, the control unit 11 operates as the second data acquisition unit 112 and acquires the plurality of second learning data sets 73, each of which is constituted by a combination of the actual data 731 and the second environmental information 732.

A method of acquiring each second learning data set 73 may not be limited, in particular, and may be appropriately selected in accordance with the present embodiment. For example, it is possible to acquire the actual data 731 by preparing the actual environment for the sensor, the robot device, the workpiece, and the like and monitoring how the robot device executes the task under various conditions using the sensor. In the present embodiment, the actual data 731 is image data (captured image) obtained by imaging the environment where the task of the industrial robot R is executed using the camera CA. The type and the format of the second environmental information 732 may be similar to those of the first environmental information 702. It is possible to appropriately generate the second environmental information 732 in accordance with the conditions of the actual environment. It is possible to generate each second learning data set 73 by combining (associating) the generated second environmental information 732 with the corresponding actual data 731.

Each second learning data set 73 may be automatically generated through operations of a computer or may be manually generated through operations of the operator. Also, the generation of each second learning data set 73 may be performed by the learning device 1 or may be performed by a computer other than the learning device 1. In a case in which each second learning data set 73 is generated by the learning device 1, the control unit 11 acquires the plurality of second learning data sets 73 by executing the aforementioned series of processes automatically or manually through operations of the operator. On the other hand, in a case in which each second learning data set 73 is generated by another computer, the control unit 11 acquires the plurality of second learning data sets 73 generated by another computer via a network or the storage medium 91, for example.

The number of second learning data sets 73 to be acquired may not be limited, in particular, and may be appropriately selected in accordance with the present embodiment. If the plurality of second learning data sets 73 are acquired, then the control unit 11 proceeds the processing to next Step S104.

(Step S104)

In Step S104, the control unit 11 operates as the first learning processing unit 114 and performs machine learning of the extractor 5 using the plurality of second learning data sets 73. In the machine learning, the control unit 11 trains the extractor 5 such that the extractor 5 extracts environmental information that conforms to the corresponding second environmental information 732 from the actual data 731 for each second learning data set 73. Step S104 is an example of the "second training step" according to the invention.

Specifically, the control unit 11 copies the value obtained by adjusting each parameter of the first portion 51 to the corresponding parameter of the second portion 52 after Step S102 is executed and before Step S104 is executed first. Next, the control unit 11 executes learning processing of the second portion 52 of the extractor 5 using, as input data, the actual data 731 included in each second learning data set 73 acquired in Step S103 and using, as teacher data, the corresponding second environmental information 732. In the present embodiment, connection between the first portion 51 and the third portion 53 is ignored, and the adjustment of the value of the parameter of the third portion 53 is omitted in the learning processing.

The processing procedure for the learning processing may be similar to that in Step S102 described above. In other words, in the first step, the control unit 11 inputs the actual data 731 to the convolution layer 521 disposed furthest on the input side in the second portion 52 for each second learning data set 73 and performs ignition determination of each neuron included in each layer (521 to 523, 531 to 533) in order from the input side. In this manner, the control unit 11 acquires, from the convolution layer 533 disposed furthest on the output side in the third portion 53, an output value corresponding to the result of extracting the environmental information from the actual data 731. In the second step, the control unit 11 calculates an error between the acquired output value and the second environmental information 732. In the third step, the control unit 11 calculates each of the errors of the weights of connection between neurons and the threshold values of the neurons in the second portion 52, using the errors of the calculated output values by the error back propagation method. In the fourth step, the control unit 11 updates each of the values of the weights of connection between the neurons and the threshold values of the neurons in the second portion 52 based on each calculated error.

The control unit 11 adjusts the value of the parameter of the second portion 52 such that if the actual data 731 is input to the second portion 52 for each of the second learning data sets 73 with the value of the parameter of the third portion 53 fixed, an output value that conforms to the corresponding second environmental information 732 is output from the third portion 53, through repetition of the aforementioned first to fourth steps. In other words, the control unit 11 repeatedly adjusts the value of the parameter of the second portion 52 in the aforementioned first to fourth steps until the sum of the errors between the output values obtained from the convolution layer 533 disposed furthest on the output side in the third portion 53 and the second environmental information 732 is equal to or less than the threshold value for each second learning data set 73. The threshold value may be appropriately set in accordance with the present embodiment. In this manner, the control unit 11 can construct the extractor 5 trained such that if the actual data 731 is input to the second portion 52 for each second learning data set 73, an output value that conforms to the corresponding second environmental information 732 is output from the third portion 53. If the machine learning using the second learning data sets 73 is completed, then the control unit 11 proceeds the processing to next Step S105.

(Step S105)

In Step S105, the control unit 11 operates as the saving processing unit 116 and saves information related to the extractor 5 after the machine learning as the first learning result data 125 in the storage unit 12. In the present embodiment, the control unit 11 performs the machine learning of the extractor 5 using the first learning data sets 70 and the second learning data sets 73 in Steps S102 and S104 described above. In other words, the performing of the machine learning of the extractor 5 includes Steps S102 and S104 described above. In Step S105, the control unit 11 generates, as the first learning result data 125, information indicating the configuration and the parameter of the extractor 5 constructed through the machine learning in Steps S102 and S104. Then, the control unit 11 saves the generated first learning result data 125 in the storage unit 12. In this manner, the control unit 11 ends the series of processes for the machine learning of the extractor 5 (first mode) according to the present embodiment.

Note that the saving destination of the first learning result data 125 may not be limited to the storage unit 12. The control unit 11 may store the first learning result data 125 in a data server such as a network attached storage (NAS), for example. The first learning result data 125 may or may not include information related to the first portion 51. Also, the control unit 11 may transfer the generated first learning result data 125 to the control device 2 at an arbitrary timing. The control device 2 may acquire the first learning result data 125 by receiving the transfer from the learning device 1 or may acquire the first learning result data 125 by accessing the learning device 1 or the data server. The first learning result data 125 may be incorporated in the control device 2 in advance.

Further, the control unit 11 may periodically update the first learning result data 125 through periodical repetition of the processing in Steps S101 to S105 described above. At the time of the repetition, a change, correction, addition, deletion, or the like of the first learning data sets 70 and the second learning data sets 73 may be appropriately executed. Also, the control unit 11 may periodically update the first learning result data 125 held in the control device 2 through the transfer of the updated first learning result data 125 to the control device 2 every time the learning processing is executed.

<Machine Learning of Controller>

Figure 8:
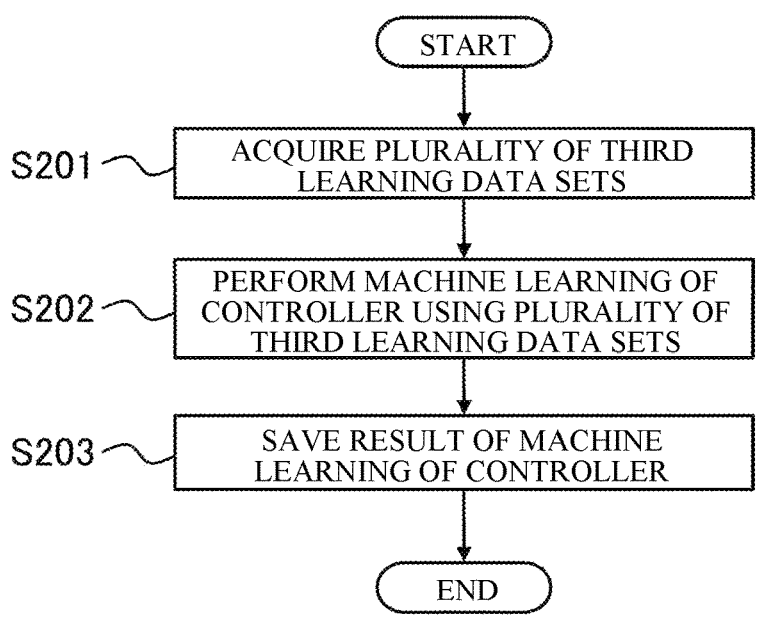
FIG. 8 illustrates an example of a processing procedure for the machine learning of the controller performed by the learning device according to the embodiment.

Next, an example of the processing procedure for the machine learning of the controller 6 (second mode) performed by the learning device 1 according to the present embodiment will be described using FIG. 8. FIG. 8 is a flowchart illustrating an example of the processing procedure for the machine learning of the controller 6 performed by the learning device 1 according to the present embodiment.

(Step S201)

In Step S201, the control unit 11 operates as the third data acquisition unit 113 and acquires the plurality of third learning data sets 76, each of which is constituted by a combination of the third environmental information 761, the state information 762, and the control command 763.

The method of acquiring each third learning data set 76 may not be limited, in particular, and may be appropriately selected in accordance with the present embodiment. For example, it is possible to prepare the simulator or the actual environment and to appropriately generate the third environmental information 761 in accordance with the conditions of the prepared simulator or actual environment. The type and the format of the third environmental information 761 may be similar to those of the first environmental information 702 and the second environmental information 732.

Alternatively, the third environmental information 761 may be generated by being extracted from other simulation data 78 using the extractor 5 after the machine learning is completed. Specifically, the simulation data 78 is input to the first portion 51, and ignition determination of each neuron included in each layer (511 to 513, 531 to 533) is performed in order from the input side. In this manner, an output value corresponding to the result of extracting the environmental information from the simulation data 78 is output from the third portion 53. The output value output from the third portion 53 may be acquired as the third environmental information 761. Note that the simulation data 78 may be acquired by a method that is similar to that for the aforementioned simulation data 701. Also, the setting of the extractor 5 after machine learning may be performed with reference to the first learning result data 125.

Also, it is possible to appropriately generate the state information 762 in accordance with the conditions for the simulation or the actual environment. Moreover, it is possible to appropriately generate the control command 763 in accordance with the conditions for the simulation or the actual environment and the task to be executed. The state information 762 may include, for example, the position, the orientation, the angle, and the acceleration of the drive unit of the industrial robot R. The control command 763 may define, for example, the amount of drive of the industrial robot R (for example, the amount of drive of a servo motor). It is possible to generate each third learning data set 76 by combining (associating) the generated state information 762 and control command 763 with the corresponding third environmental information 761.

Each third learning data set 76 may be automatically generated through operations of a computer or may be manually generated through operations of the operator. Also, the generation of each third learning data set 76 may be performed by the learning device 1 or may be performed by a computer other than the learning device 1. In a case in which each third learning data set 76 is generated by the learning device 1, the control unit 11 acquires the plurality of third learning data sets 76 by executing the aforementioned series of processes automatically or manually through operations of the operator. On the other hand, in a case in which each third learning data set 76 is generated by another computer, the control unit 11 acquires the plurality of third learning data sets 76 generated by another computer via a network or the storage medium 91, for example.

The number of third learning data sets 76 to be acquired may not be limited, in particular, and may be appropriately selected in accordance with the present embodiment. If the plurality of third learning data sets 76 are acquired, then the control unit 11 proceeds the processing to next Step S202.

(Step S202)

In Step S202, the control unit 11 operates as the second learning processing unit 115 and performs the machine learning of the controller 6 using the plurality of third learning data sets 76. In the machine learning, the control unit 11 trains the controller 6 such that if the third environmental information 761 and the state information 762 are input for each third learning data set 76, the controller 6 outputs a control command that conforms to the corresponding control command 763. Step S202 is an example of the "training step of training the controller" according to the invention.

Specifically, the control unit 11 prepares the controller 6 that is a target of processing first. A configuration of the controller 6 to be prepared, an initial value of the weight of connection between neurons, and an initial value of the threshold value of each neuron may be provided by a template or may be provided through inputs of the operator. Also, in a case in which re-learning is performed, the control unit 11 may prepare the controller 6 based on the learning result data obtained through machine learning in the past.

Next, the control unit 11 executes the learning processing of the controller 6 using, as input data, the third environmental information 761 and the state information 762 included in each third learning data set 76 acquired in Step S201 and using, as teacher data, the corresponding control command 763. The learning processing may be similar to that in Steps S102 and S104 described above. In other words, in the first step, the control unit 11 inputs the third environmental information 761 and the state information 762 to the input layer 61 for each third learning data set 76 and performs ignition determination of each neuron included in each of the layers 61 to 63 in order from the input side. In this manner, the control unit 11 acquires, from the output layer 63, an output value corresponding to the result of deriving the control command from the third environmental information 761 and the state information 762. In the second step, the control unit 11 calculates an error between the acquired output value and the control command 763. In the third step, the control unit 11 calculates each of the errors of the weights of the connection between the neurons and the threshold values of the neurons in the controller 6 using the error of the calculated output value by the error back propagation method. In the fourth step, the control unit 11 updates each of the values of the weights of the connection between the neurons and the thresholds of the neurons in the controller 6 based on each calculated error.

The control unit 11 adjusts the value of the parameter of the controller 6 such that if the third environmental information 761 and the state information 762 are input for each third learning data set 76, the controller 6 outputs the output value that conforms to the corresponding control command 763 through repetition of the aforementioned first to fourth steps. In other words, the control unit 11 repeatedly adjusts the value of the parameter of the controller 6 in the aforementioned first to fourth steps until the sum of the errors between the output values obtained from the output layer 63 and the control command 763 is equal to or less than a threshold value for each third learning data set 76. The threshold value may be appropriately set in accordance with the present embodiment. In this manner, the control unit 11 can construct the controller 6 trained such that if the third environmental information 761 and the state information 762 are input for each third learning data set 76, the controller 6 outputs the output value that conforms to the corresponding control command 763. If the machine learning of the controller 6 is completed, then the control unit 11 proceeds the processing to next Step S203.

(Step S203)

In Step S203, the control unit 11 operates as the saving processing unit 116 and saves information related to the controller 6 after machine learning as the second learning result data 128 in the storage unit 12. In the present embodiment, the control unit 11 generates, as the second learning result data 128, information indicating the configuration and the parameter of the controller 6 constructed through the machine learning in Step S202. Then, the control unit 11 saves the generated second learning result data 128 in the storage unit 12. In this manner, the control unit 11 ends the series of processes for the machine learning of the controller 6 (second mode) according to the present embodiment.

Note that the saving destination of the second learning result data 128 may not be limited to the storage unit 12 similarly to the aforementioned first learning result data 125. Also, the second learning result data 128 may be incorporated in the control device 2 at an arbitrary timing similarly to the first learning result data 125. Moreover, the control unit 11 may periodically update the second learning result data 128 through periodical repetition of the processing in Steps S201 to S203 described above. At the time of the repetition, a change, correction, addition, deletion, or the like of the third learning data set 76 may be appropriately executed. Then, the control unit 11 may periodically update the second learning result data 128 held by the control device 2 through the transfer of the updated second learning result data 128 to the control device 2 every time the learning processing is executed.

[Control Device]

Figure 9:
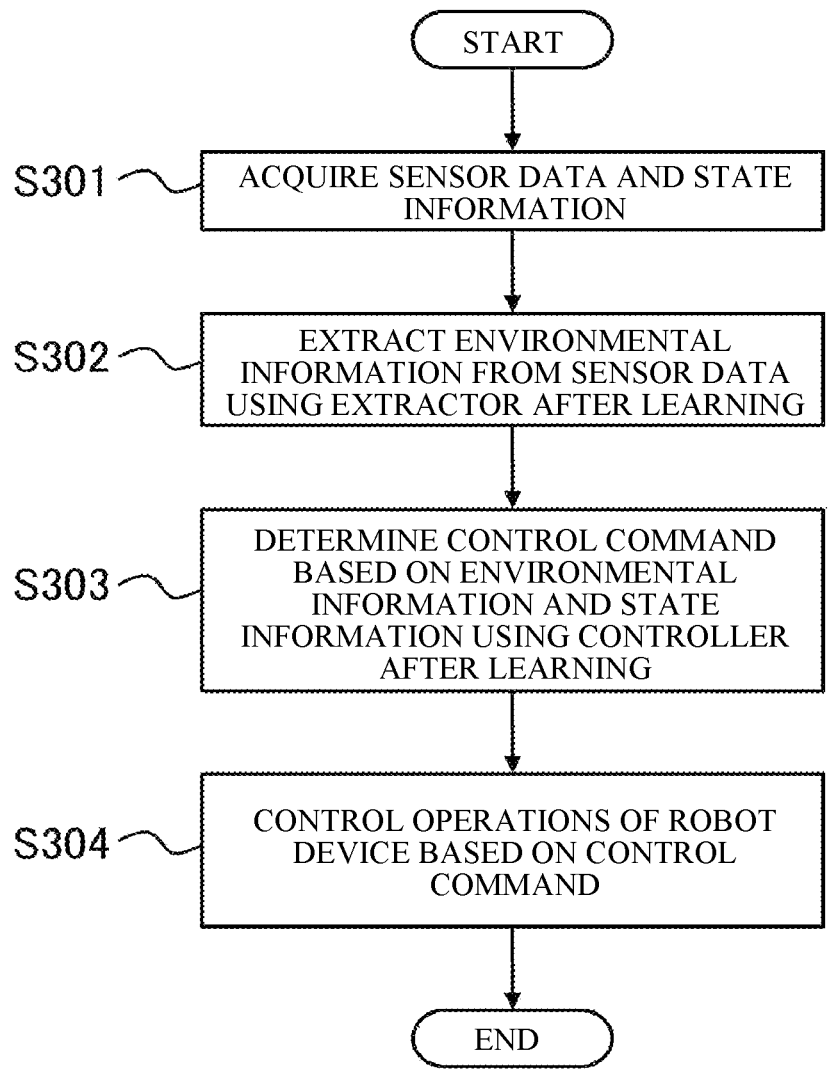
FIG. 9 illustrates an example of a processing procedure for robot control performed by the control device according to the embodiment.

Next, an operation example of the control device 2 will be described using FIG. 9. FIG. 9 is a flowchart illustrating an example of the processing procedure of the control device 2 according to the present embodiment. However, the processing procedure described below is merely an example, and each process may be changed as long as the change can be made. Also, in regard to the processing procedure described below, omission, replacement, and addition of steps can be appropriately made in accordance with the present embodiment.

(Step S301)

In Step S301, the control unit 21 operates as the data acquisition unit 211 and acquires sensor data obtained by the sensor that monitors the environment where the task of the industrial robot R is executed. In the present embodiment, the control unit 21 acquires, as the sensor data, the image data 80 obtained by the camera CA imaging the environment of the industrial robot R, via the external interface 24. The image data 80 may be video data or may be stationary image data.

Also, the control unit 21 acquires the state information 83 related to the state of the industrial robot R when the task is executed. For example, the control unit 21 may acquire the state information 83 through an inquiry of the current state to the industrial robot R via the external interface 24. The type and the format of the state information 83 may be similar to those of the aforementioned state information 762. If the image data 80 and the state information 83 are acquired, then the control unit 21 proceeds the processing to next Step S302.

However, the path through which the image data 80 and the state information 83 are acquired may not be limited to such an example and may be appropriately selected in accordance with the present embodiment. For example, the camera CA and the industrial robot R may be connected to another computer that is different from the control device 2. In this case, the control device 2 may acquire the image data 80 and the state information 83 through reception of the image data 80 and the state information 83 transmitted from another computer.

(Step S302)

In Step S302, the control unit 21 operates as the information extraction unit 212 and extracts, from the image data 80, the environmental information 81 related to the environment where the task is executed, using the extractor 5 after machine learning. In the present embodiment, the control unit 21 performs setting of the extractor 5 after machine learning with reference to the first learning result data 125. Then, the control unit 21 inputs the image data 80 to the second portion 52 and performs ignition determination of each neuron included in each layer (521 to 523, 531 to 533) in order form the input side. In this manner, the control unit 21 acquires, from the third portion 53, the output value corresponding to the result of extracting the environmental information 81 from the image data 80. If the environmental information 81 is acquired, then the control unit 21 proceeds the processing to next Step S303.

(Step S303)

In Step S303, the control unit 21 operates as the command determination unit 213 and determines the control command 85 for causing the industrial robot R to execute the task under the conditions indicated by the environmental information 81 and the state information 83, using the controller 6 after machine learning. In the present embodiment, the control unit 21 performs setting of the controller 6 after machine learning with reference to the second learning result data 128. Then, the control unit 21 inputs the environmental information 81 and the state information 83 to the input layer 61 and performs ignition determination of each neuron included in each of the layers 61 to 63 in order from the input side. In this manner, the control unit 21 acquires, from the output layer 63, an output value corresponding to the result of deriving the control command 85 from the environmental information 81 and the state information 83. The control unit 21 determines the control command 85 through the acquisition of the output value. If the control command 85 is determined, then the control unit 21 proceeds the processing to next Step S304.

(Step S304)

In Step S304, the control unit 21 operates as the operation control unit 214 and controls operations of the industrial robot R based on the determined control command 85. In the present embodiment, the control unit 21 causes the industrial robot R to execute operations defined by the control command 85 through transmission of a control signal corresponding to the control command 85 to the industrial robot R via the external interface 24. If the operations of the industrial robot R are controlled in this manner, then the control unit 21 ends the processing in the operation example. Thereafter, the control unit 21 may continuously control the operations of the industrial robot R through repetition of the series of processes from Step S301.

[Features]

As described above, the control module for controlling the operations of the industrial robot R is split into the two components, namely the extractor 5 and the controller 6 in the present embodiment. The learning device 1 according to the present embodiment constructs the extractor 5 such that the extractor 5 extracts common features (environmental information) from both the simulation data 701 and the actual data 731 using both types of data (701, 731) through the series of processes in Steps S101 to S104. In this manner, it is possible to absorb the gap between the simulation data 701 and the actual data 731 and then reflect the achievement of the first training step using the simulation data 701 in Step S102 to the second training step using the actual data 731 in Step S104. Therefore, if the number of simulation data items 701 (first learning data sets 70) used for machine learning is sufficient, it is possible to construct the extractor 5 after machine learning capable of accurately extracting the environmental information from the sensor data obtained in the actual environment even if the number of actual data items 731 (second learning data sets 73) used for machine learning is small.

In addition, the features (environmental information) extracted from the sensor data can be obtained through the simulation similarly to the actual environment. Therefore, it is possible to construct the controller 6 after machine learning that is operable in the actual environment through the machine learning using the obtained third learning data sets 76 even if the simulator is used without using an actual machine of the industrial robot R in Steps S201 and S202. Therefore, according to the present embodiment, it is possible to employ the simulation data 701 for at least a part of (preferably a most part of) learning data by splitting the control module into the two components, namely the extractor 5 and the controller 6 and thereby to reduce cost for collecting the learning data used for machine learning. Moreover, it is possible to constitute the control module that is operable in the actual environment with the extractor 5 and the controller 6 constructed through the machine learning. Therefore, according to the present embodiment, it is possible to construct, while reducing a cost for collecting learning data used in machine learning that makes a control module acquire an ability to control an industrial robot R, the control module operatable in an actual environment by the machine learning. Also, the control device 2 according to the present embodiment can appropriately control the operations of the industrial robot R in the actual environment through execution of the processing in Steps S301 to S304 using the control module constructed in this manner.

Note that in the present embodiment, the simulation data 701 generated with the conditions for the simulation randomly changed may be acquired in Step S101. In this manner, it is possible to construct the extractor 5 that is robust against a change in environment through the machine learning using each first learning data set 70 including the simulation data 701 in Step S102. Also, the learning device 1 according to the present embodiment adjusts the value of the parameter of the second portion 52 with the value of the parameter of the third portion 53 fixed in Step S104 described above. In this manner, it is possible to reduce the total number of parameters to be updated in Step S104 while absorbing the difference between the simulation data 701 and the actual data 731 with the configurations (first portion 51 and the second portion 52) on the input side and thereby to curb the amount of calculation required for the learning processing.

Also, according to the present embodiment, the configurations of the extractor 5 and the controller 6 are simpler than those in a case in which the control module is constructed by a single learning model. Therefore, it is possible to curb calculation cost for the learning processing in Steps S102, S104, and S202 and the command determination processing in Steps S302 and S303.

Further, the learning processing (Steps S102 and S104) of the extractor 5 and the learning processing (Step S202) of the controller 6 can be individually performed in the present embodiment. Therefore, it is possible to replace or re-learn only the extractor 5 and thereby to adapt to a change in environment using the industrial robot R. Also, it is possible to replace or re-learn only the controller 6 and thereby to adapt to a change in industrial robot R. Thus, according to the present embodiment, it is possible to cause the control device 2 to adapt to a change in actual environment through replacement of either the extractor 5 or the controller 6 rather than replacement of the entire control module. It is thus possible to reduce cost for causing the control device 2 to adapt to a change in actual environment.

§ 4. Modification Examples

Although the present embodiment of the invention has been described in detail, the above description is merely an illustration of the invention in all senses. It is a matter of course that various improvements and modifications can be made without departing from the scope of the invention. For example, the following change can be made. Note that similar reference signs will be used below for components that are similar to those in the aforementioned embodiment and description of points that are similar to those in the aforementioned embodiment will be appropriately omitted. The following modification examples can be appropriately combined.

<4.1>

In the aforementioned embodiment, a convolutional neural network is used for the extractor 5, and a fully connected neural network with a multilayer structure is used for the controller 6. However, the structure and the type of the neural network constituting each of the extractor 5 and the controller 6 may not be limited to such an example and may be appropriately selected in accordance with the present embodiment. For example, a recurrence neural network may be used for each of the extractor 5 and the controller 6.

Also, the learning model constituting each of the extractor 5 and the controller 6 may not be limited to the neural network and may be appropriately selected in accordance with the present embodiment. As the learning model for each of the extractor 5 and the controller 6, a learning model other than the neural network, such as a support vector machine, for example, may be used. Also, in the aforementioned embodiment, each learning result data (125, 128) includes information indicating the configuration of the neural network after learning. However, the configuration of each learning result data (125, 128) may not be limited to such an example and may be appropriately determined in accordance with the present embodiment as long as it is possible to use the configuration for the setting of each of the extractor 5 and the controller 6 after learning. In a case in which the configuration of the neural network in each of the extractor 5 and the controller 6 is shared by each device, for example, each learning result data (125, 128) may not include the information indicating the configuration of the neural network after learning.

<4.2>

In regard to the information processing (FIGS. 7 to 9) according to the aforementioned embodiment, omission, replacement, and addition of steps can be appropriately made in accordance with the present embodiment. For example, the processing order of Steps S101 to S104 may be appropriately changed as long as Step S101 is executed before Step S102 and Step S103 is executed before Step S104. In Step S104 described above, the values of the parameters of the second portion 52 and the third portion 53 may be adjusted similarly to Step S102 rather than fixation of the value of the parameter of the third portion 53, in Step S104 described above. It is only necessary for the processing of acquiring the state information 83 in Step S301 described above to be completed before the processing in Step S303 is executed. Also, the second training step (Step S104) may be executed before the first training step (Step S102), for example. In this case, the control unit 11 adjusts the value of the parameter of the second portion 52 through execution of the second training step (Step S104). In the second training step, the value of the parameter of the third portion 53 may be fixed similarly to the aforementioned embodiment or may be adjusted along with the second portion 52. After the second training step is executed, the control unit 11 copies the value obtained by adjusting each parameter of the second portion 52 to the corresponding parameter of the first portion 51. Then, the control unit 11 adjusts the value of the parameter of the first portion 51 through execution of the first training step (Step S102). In the first training step, the value of the parameter of the third portion 53 may be adjusted along with the first portion 51 similarly to the aforementioned embodiment or may be fixed. After the first training step is executed, the control unit 11 copies the value obtained by adjusting each parameter of the first portion 51 to the corresponding parameter of the second portion 52. In this manner, it is possible to reflect the achievement of the machine learning using the simulation data 701 to the machine learning using the actual data 731.

<4.3>

The aforementioned embodiment assumes that the output of the extractor 5 corresponds directly to the environmental information and the output of the controller 6 corresponds directly to the control command. However, the output format of the extractor 5 and the controller 6 may not be limited to such an example. In the aforementioned embodiment, the environmental information may be derived through execution of some information processing on the output value of the extractor 5. Similarly, the control command may be derived through execution of some information processing on the output value of the controller 6.

Also, in the aforementioned embodiment, each environmental information (702, 732, 761) corresponds to an output of the final layer (convolution layer 533) of the neural network. However, the format of each environmental information (702, 732, 761) may not be limited to such an example. The learning device 1 according to the aforementioned embodiment adjusts the value of the parameter of the second portion 52 with the value of the parameter of the third portion 53 fixed in Step S104 described above. In this manner, it is possible to construct the neural network such that the outputs of the first portion 51 and the second portion 52 are mapped in a common feature apace while absorbing the difference between the simulation data 701 and the actual data 731 with the configurations (first portion 51 and the second portion 52) on the input side. Thus, the feature amount output from the intermediate layer constituting the common feature space may be used as each environmental information (702, 732, 761) in the neural network. For example, at least the third environmental information 761 out of the environmental information (702, 732, 761) may be expressed with the feature amount output from the intermediate layer of the neural network.

Figure 10:
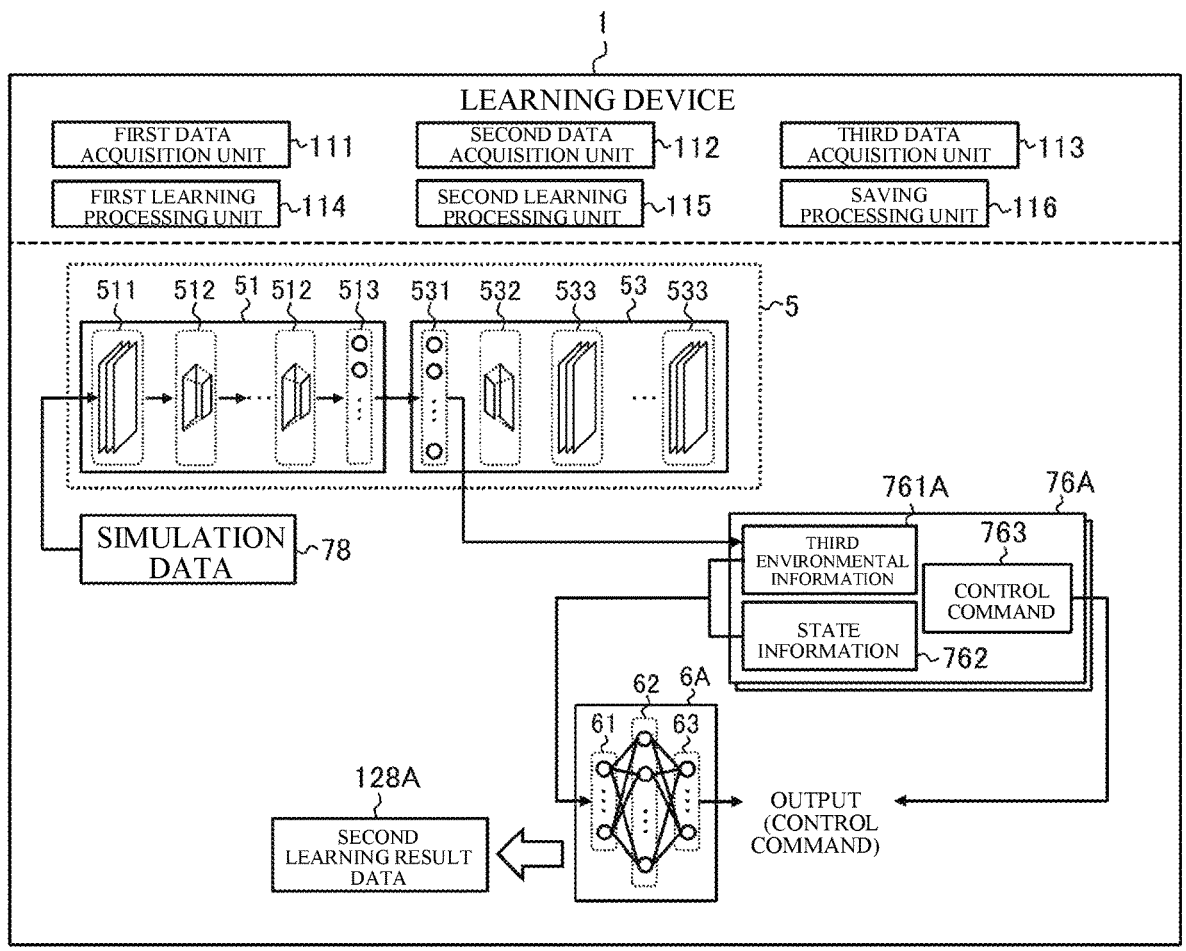
FIG. 10 schematically illustrates an example of a software configuration of a learning device according to a modification example.
Figure 11:
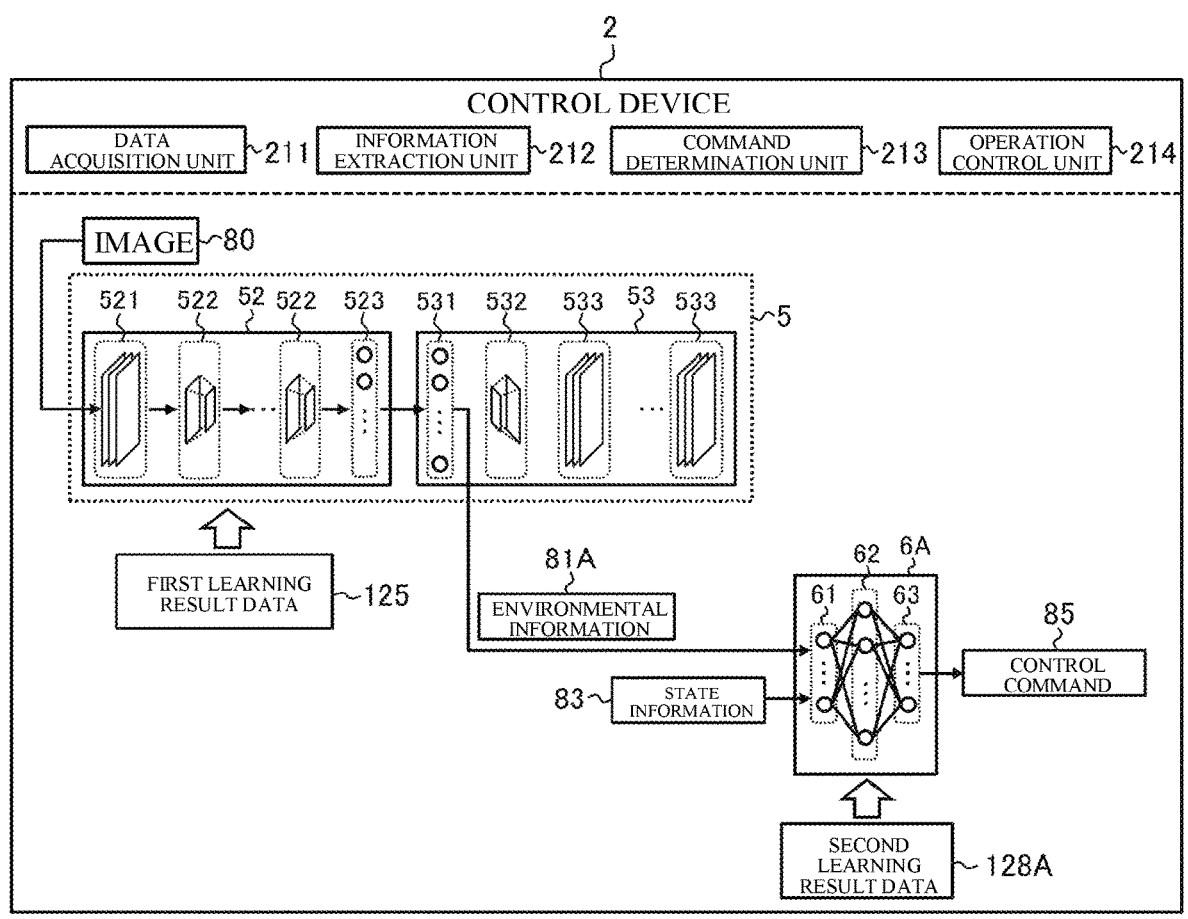
FIG. 11 schematically illustrates an example of a software configuration of a control device according to a modification example.

FIGS. 10 and 11 illustrate an exemplary modification example in which the environmental information is expressed with the feature amount output from the intermediate layer of the neural network. FIG. 10 schematically illustrates an example of the process for deriving third environmental information 761A in the learning device 1 according to the modification example. FIG. 11 schematically illustrates an example of the process for deriving environmental information 81A in the control device 2 according to the modification example. The modification examples of FIGS. 10 and 11 are similar to the aforementioned embodiment other than that the third environmental information 761A and the environmental information 81A correspond to outputs of the fully connected layer 531 of the third portion 53.

As illustrated in FIG. 10, the learning device 1 according to the modification example acquires a plurality of third learning data sets 76A, each of which is constituted by a combination of the third environmental information 761A, the state information 762, and the control command 763 in Step S201 described above. The simulation data 78 is input to the first portion 51, and ignition determination of each neuron included in each layer (511 to 513, 531) is performed in order from the input side. In this manner, the output value output from the fully connected layer 531 is acquired as the third environmental information 761A. In Step S202 described above, the control unit 11 performs machine learning of the controller 6A using the plurality of third learning data sets 76A acquired in this manner. The configuration of the controller 6A is similar to that of the controller 6 according to the aforementioned embodiment. In Step S203 described above, the control unit 11 saves information indicating the configuration and the parameter of the controller 6A after machine learning as second learning result data 128A in the storage unit 12.

On the other hand, the control device 2 according to the modification example uses the controller 6A after machine learning constituted in this manner as illustrated in FIG. 11. Specifically, in Step S302 described above, the control unit 21 inputs the image data 80 to the second portion 52 and performs ignition determination of each neuron included in each layer (521 to 523, 531) in order from the input side. In this manner, the control unit 21 acquires an output value output from the fully connected layer 531 as the environmental information 81A. In Step S303 described above, the control unit 21 performs setting of the controller 6A after machine learning with reference to the second learning result data 128A. Then, the control unit 21 inputs the environmental information 81A and the state information 83 to the input layer 61 and performs ignition determination of each neuron included in each of the layers 61 to 63 in order from the input side. In this manner, the control unit 21 acquires, from the output layer 63, an output value corresponding to the result of deriving the control command 85 from the environmental information 81A and the state information 83. In this manner, it is possible to achieve operations that are similar to those in the aforementioned embodiment using the environmental information expressed with the feature amount output from the intermediate layer of the neural network in the modification example.

<4.4>

In the aforementioned embodiment, the camera CA is used as the sensor that monitors the environment of the industrial robot R. However, the sensor that monitors the environment of the industrial robot R may not be limited to such an example. The sensor may be constituted by, for example, a camera, a pressure sensor, a load cell, or a combination thereof. The simulation data 701 and the actual data 731 may be appropriately acquired in accordance with the sensor to be used.

<4.5>

In the aforementioned embodiment, the industrial robot R is exemplified as the robot device that is a target of control. However, the type of the robot device that is a target of control may not be limited to such an example and may be appropriately selected in accordance with the present embodiment as long as the device has at least one drive unit configured to be able to perform automatic driving. As the robot device, an autonomous robot or a mobile body (for example, a flying object such as a done or a vehicle such as a passenger car) configured to be able to execute automatic driving operations, for example, may be employed in addition to the aforementioned industrial robot R. The type of the sensor may not be limited, in particular, and may be appropriately selected in accordance with the present embodiment as long as the device can monitor (or sense) the environment where the task of the robot device is executed. As the sensor, a camera, a LIDAR sensor, a thermo sensor, a pressure sensor, or a load cell, for example, may be employed. The type of the sensor data (simulation data, actual data) may be appropriately selected in accordance with the type of the sensor. The sensor data may be, for example, image (for example, an RGB image or a depth image) data, measurement data obtained by a LIDAR sensor, a thermo data, or a pressure data.

Figure 12:
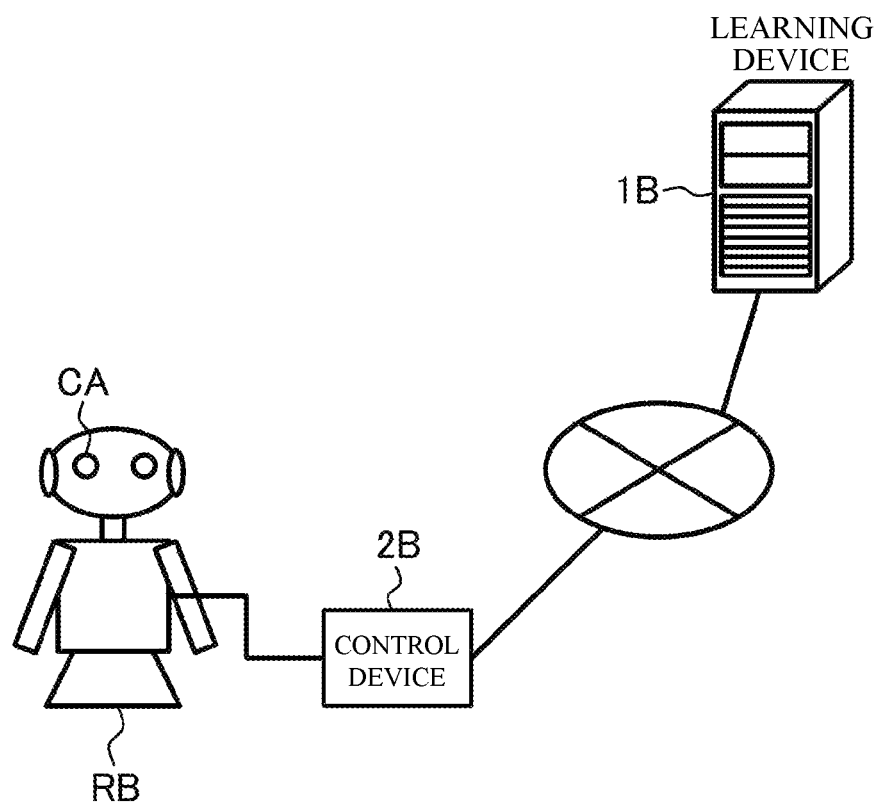
FIG. 12 schematically illustrates another example of a situation to which the invention is applied.

FIG. 12 illustrates an example in which an autonomous robot RB is employed as the robot device as an example of another situation to which the invention is applied. The autonomous robot RB is configured to be able to operate autonomously. The autonomous robot RB may be configured to perform cooking, for example. A learning device 1B according to the modification example is a computer configured to construct an extractor and a controller for controlling operations of the autonomous robot RB through machine learning. A control device 2B according to the modification example is a computer configured to control operations of the autonomous robot RB using the extractor and the controller constructed by the learning device 1B. The learning device 1B according to the modification example may be configured similarly to the learning device 1 according to the aforementioned embodiment, and the control device 2B according to the modification example may be configured similarly to the control device 2 according to the aforementioned embodiment, other than that the types of the sensor and the information to be dealt with may be different.

The sensor that monitors the environment of the autonomous robot RB may be constituted by, for example, a camera, a thermo sensor, a microphone, or a combination thereof. Each environmental information may include at least any of segmentation information and information related to attributes of a target in relation to the execution of the task. In the case in which the task is cooking, the target related to the execution of the task is, for example, an ingredient, a cooling tool, or the like. The target may include not only a thing but also a person. The state information may include, for example, the position, the orientation, the angle, and the acceleration of the drive unit of the autonomous robot RB. The control command may define at least any of an amount of drive, an output sound, and a screen display of the autonomous robot RB. According to the modification example, it is possible to construct the control module for controlling operations of the autonomous robot RB. Note that in a case in which sound output and screen display are performed, the autonomous robot RB includes a corresponding output device (for example, a speaker or a display).

Figure 13:
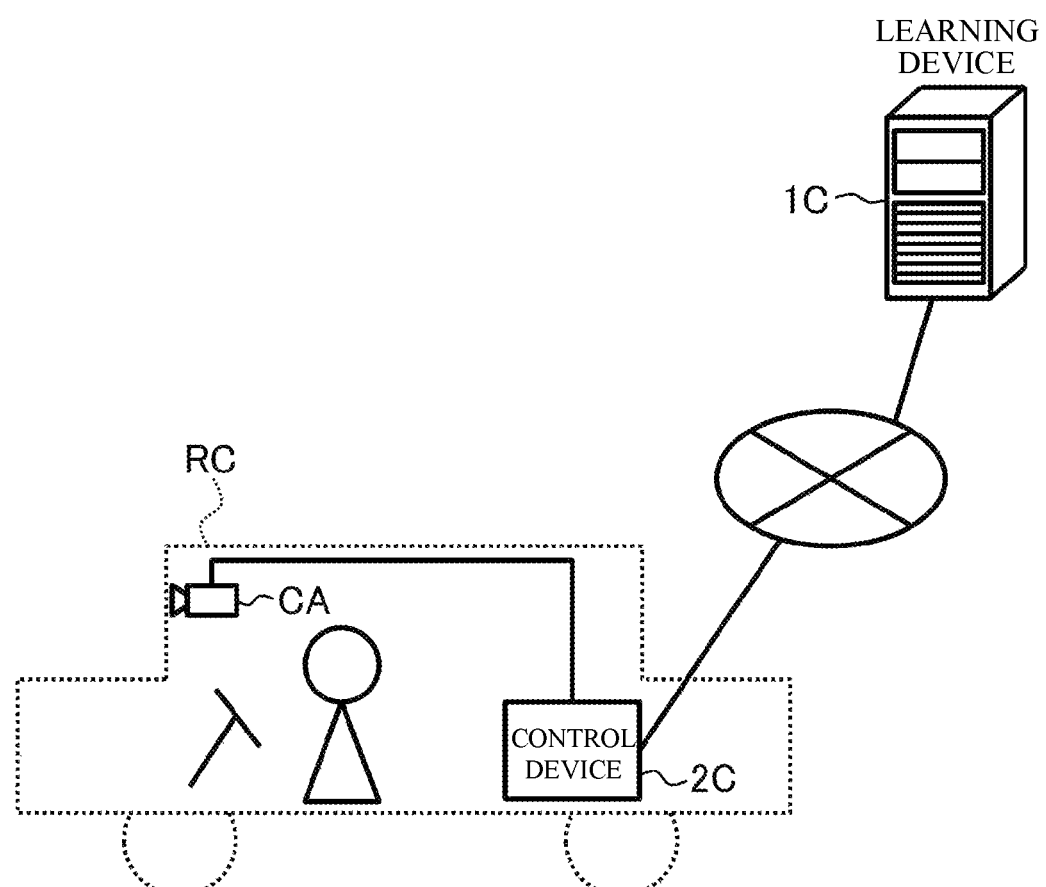
FIG. 13 schematically illustrates another example of a situation to which the invention is applied.

FIG. 13 illustrates an example in which a vehicle RC configured to be able to execute automatic driving operations is employed as a robot device, as an example of another situation to which the invention is applied. The vehicle RC is a position example of the mobile body. The vehicle RC includes typical vehicle configurations such as an accelerator, a brake, a handle, a light, and a car horn. A learning device 1C according to the modification example is a computer configured to construct an extractor and a controller for controlling operations of the vehicle RC through machine learning. A control device 2C according to the modification example is a computer configured to control operations of the vehicle RC using the extractor and the controller constructed by the learning device 1C. The learning device 1C according to the modification example may be configured similarly to the learning device 1 according to the aforementioned embodiment, and the control device 2C according to the modification example may be configured similarly to the control device 2 according to the aforementioned embodiment other than that types of sensors and information to be dealt with may be different.

The sensor that monitors the environment of the vehicle RC may be constituted by, for example, a camera, a LIDAR sensor, or a combination thereof. Each environmental information may include, for example, at least any of information related to a path through which the mobile body travels and information related to object that is present in a traveling direction of the mobile body. In the modification example, the path through which the mobile body travels is a road through which the vehicle RC can travel. Also, the object that is present in the traveling direction of the mobile body is, for example, a traffic signal or an obstacle (a person or a thing). The state information may include, for example, information related to a moving state of the mobile body. In the modification example, the state information may include, for example, the current amount of acceleration of the vehicle RC, the current amount of the brake, the current steering angle of the handle, whether or not the light has been turned on, and whether or not the car horn is used. The control command may define, for example, at least any of the amount of acceleration of the vehicle RC, the amount of braking, the steering angle of the handle, turning-on of the light, and utilization of the car horn. According to the modification example, it is possible to construct the control module for controlling operations of the vehicle RC.

The invention claimed is:

1. A learning device comprising:
a first processor, configured to:
acquire a plurality of first learning data sets, each of which is constituted by a combination of simulation data generated by simulating an actual sensor that monitors an environment where a task of a robot device is executed and first environmental information related to the environment where the task indicated by the simulation data is executed;
acquire a plurality of second learning data sets, each of which is constituted by a combination of actual data obtained by the actual sensor and second environmental information related to an environment where the task indicated by the actual data is executed;
acquire a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information;
perform machine learning of an extractor using the first learning data sets and the second learning data sets; and
perform machine learning of a controller using the third learning data sets,
wherein the performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the performing of the machine learning of the controller includes a training step of training the controller such that if the third environmental information and the state information are input, an output control command that conforms to the corresponding control command is output.

2. The learning device according to claim 1, wherein the simulation data of each of the first learning data sets is generated with conditions for simulating the actual sensor randomly changed.

3. The learning device according to claim 1,
wherein the extractor is constituted by a neural network,
the neural network is split into a first portion, a second portion, and a third portion,
the first portion and the second portion are disposed in parallel on an input side of the neural network, have the same structure, and thus have common parameters,
the first portion is configured to receive an input of the simulation data,
the second portion is configured to receive an input of the actual data,
the third portion is disposed on an output side of the neural network and is configured to receive an output of each of the first portion and the second portion,
in the first training step, the first processor adjusts each of values of parameters of the first portion and the third portion such that an output value that conforms to the corresponding first environmental information is output from the third portion if the simulation data is input to the first portion for each of the first learning data sets, and
the first processor copies the adjusted value of the parameter of the first portion to the parameter of the second portion after the first training step is executed and before the second training step is executed.

4. The learning device according to claim 3, wherein in the second training step, the first processor adjusts the value of the parameter of the second portion such that if the actual data is input to the second portion for each of the second learning data sets with the value of the parameter of the third portion fixed, an output value that conforms to the corresponding second environmental information is output from the third portion.

5. The learning device according to claim 1, wherein the third environmental information is obtained through extraction from other simulation data generated by simulating the actual sensor using the extractor after completion of the machine learning.

6. The learning device according to claim 1,
wherein the robot device is an industrial robot in a production line,
the actual sensor is constituted by a camera, a pressure sensor, a load cell or a combination thereof,
each of the environmental information includes at least any of segmentation information, information related to attributes of a workpiece that is a target of the task, information related to a position where the task is executed, information indicating whether or not there is an obstacle, and information related to attributes of the obstacle, and the control command defines an amount of drive of the industrial robot.

7. The learning device according to claim 1,
wherein the robot device is an autonomous robot configured to be able to operate autonomously,
the actual sensor is constituted by a camera, a thermo sensor, a microphone, or a combination thereof,
each of the environmental information includes at least any of segmentation information and information related to attributes of a target in relation to the execution of the task, and
the control command defines at least any of an amount of drive of the autonomous robot, an output sound, and a screen display.

8. The learning device according to claim 1,
wherein the robot device is a mobile body configured to be able to execute an automatic driving operation,
the actual sensor is constituted by a camera, a LIDAR sensor, or a combination thereof,
each of the environmental information includes at least any of information related to a path through which the mobile body travels and information related to a target that is present in a traveling direction of the mobile body, and
the control command defines at least any of an amount of acceleration of the mobile body, an amount of braking, a steering angle of a handle, turning-on of a light, and utilization of a car horn.

9. A control system comprising:
a learning device comprising:
a first processor, configured to:
acquire a plurality of first learning data sets, each of which is constituted by a combination of simulation data generated by simulating an actual sensor that monitors an environment where a task of a robot device is executed and first environmental information related to the environment where the task indicated by the simulation data is executed;
acquire a plurality of second learning data sets, each of which is constituted by a combination of actual data obtained by the actual sensor and second environmental information related to an environment where the task indicated by the actual data is executed;
acquire a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information;
perform machine learning of an extractor using the first learning data sets and the second learning data sets; and
perform machine learning of a controller using the third learning data sets,
wherein the performing of the machine learning of the extractor includes
a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the performing of the machine learning of the controller includes a training step of training the controller such that if the third environmental information and the state information are input, an output control command that conforms to the corresponding control command is output and a control device that controls operations of the robot device, the control device comprising:

a second processor, configured to:

acquire sensor data obtained by the actual sensor that monitors a current environment where a current task of the robot device is executed and current state information related to a current state of the robot device when the current task is executed;

extract, from the sensor data, current environmental information related to the current environment where the current task is executed, using the extractor after machine learning, which is constructed by the learning device;

determine a current output control command for causing the robot device to execute the current task under conditions indicated by the current environmental information and the current state information, using the controller after machine learning, which is constructed by the learning device; and control operations of the robot device based on the determined current output control command.

10. A learning method comprising the steps of, by a computer:

acquiring a plurality of first learning data sets, each of which is constituted by a combination of simulation data generated by simulating an actual sensor that monitors an environment where a task of a robot device is executed and first environmental information related to the environment where the task indicated by the simulation data is executed;

acquiring a plurality of second learning data sets, each of which is constituted by a combination of actual data obtained by the actual sensor and second environmental information related to an environment where the task indicated by the actual data is executed;

acquiring a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information;

performing machine learning of an extractor using the first learning data sets and the second learning data sets; and performing machine learning of a controller using the third learning data sets, wherein the step of performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the step of performing of the machine learning of the controller includes a training step of training the controller such that if the third environmental information and the state information are input, an output control command that conforms to the corresponding control command is output.

11. A non-transitory computer-readable recording medium, recording a learning program for causing a computer to execute the steps of:

acquiring a plurality of first learning data sets, each of which is constituted by a combination of simulation data generated by simulating an actual sensor that monitors an environment where a task of a robot device is executed and first environmental information related to the environment where the task indicated by the simulation data is executed;

acquiring a plurality of second learning data sets, each of which is constituted by a combination of actual data obtained by the actual sensor and second environmental information related to an environment where the task indicated by the actual data is executed;

acquiring a plurality of third learning data sets, each of which is constituted by a combination of third environmental information related to the environment where the task is executed, state information related to a state of the robot device when the task is executed, and a control command for causing the robot device to execute the task under conditions indicated by the third environmental information and the state information;

performing machine learning of an extractor using the first learning data sets and the second learning data sets; and performing machine learning of a controller using the third learning data sets, wherein the step of performing of the machine learning of the extractor includes a first training step of training the extractor such that environmental information that conforms to the corresponding first environmental information is extracted from the simulation data for each of the first learning data sets, and a second training step of training the extractor such that environmental information that conforms to the corresponding second environmental information is extracted from the actual data for each of the second learning data sets after executing the first training step, and the step of performing of the machine learning of the controller includes a training step of training the controller such that if the third environmental information and the state information are input, an output control command that conforms to the corresponding control command is output.

12. The learning device according to claim 2, wherein the extractor is constituted by a neural network, the neural network is split into a first portion, a second portion, and a third portion, the first portion and the second portion are disposed in parallel on an input side of the neural network, have the same structure, and thus have common parameters, the first portion is configured to receive an input of the simulation data, the second portion is configured to receive an input of the actual data, the third portion is disposed on an output side of the neural network and is configured to receive an output of each of the first portion and the second portion, in the first training step, the first processor adjusts each of values of parameters of the first portion and the third portion such that an output value that conforms to the corresponding first environmental information is output from the third portion if the simulation data is input to the first portion for each of the first learning data sets, and the first processor copies the adjusted value of the parameter of the first portion to the parameter of the second portion after the first training step is executed and before the second training step is executed.

13. The learning device according to claim 12, wherein in the second training step, the first processor adjusts the value of the parameter of the second portion such that if the actual data is input to the second portion for each of the second learning data sets with the value of the parameter of the third portion fixed, an output value that conforms to the corresponding second environmental information is output from the third portion.

* * * * *